(12) United States Patent
Chen et al.

(10) Patent No.: US 8,305,697 B1
(45) Date of Patent: Nov. 6, 2012

(54) IMAGE CAPTURING LENS ASSEMBLY

(75) Inventors: Chun-Shan Chen, Taichung (TW);
Hsin-Hsuan Huang, Taichung (TW)

(73) Assignee: Largan Precision Co., Ltd., Taichung (TW)

( * ) Notice: Subject to any disclaimer, the term of this patent is extended or adjusted under 35 U.S.C. 154(b) by 0 days.

(21) Appl. No.: 13/236,845

(22) Filed: Sep. 20, 2011

(30) Foreign Application Priority Data

May 24, 2011 (TW) .............................. 100118075 A

(51) Int. Cl.
*G02B 3/02* (2006.01)
*G02B 9/60* (2006.01)
(52) U.S. Cl. .................... 359/714; 359/763; 359/764
(58) Field of Classification Search .................. 359/714, 359/763, 764
See application file for complete search history.

(56) References Cited

U.S. PATENT DOCUMENTS 7,355,801 B2    4/2008   Chen et al.

*Primary Examiner* — Jack Dinh
(74) *Attorney, Agent, or Firm* — Morris, Manning & Martin, LLP; Tim Tingkang Xia, Esq.

(57) ABSTRACT

This invention provides an image capturing lens assembly in order from an object side to an image side comprising: a first lens element with positive refractive power having a convex object-side surface; a second lens element with negative refractive power; a third lens element with negative refractive power having a concave object-side surface; a fourth lens element having a concave object-side surface and a convex image-side surface; and a fifth lens element having a concave image-side surface, the object-side and image-side surfaces thereof being aspheric and at least one inflection point being formed on at least one of the object-side and image-side surfaces thereof. By such arrangement, it can effectively reduce the aberration as well as the total track length of the imaging lens system for obtaining higher image resolution.

20 Claims, 18 Drawing Sheets

IMAGE CAPTURING LENS ASSEMBLY

CROSS-REFERENCE TO RELATED APPLICATIONS

This non-provisional application claims priority under 35 U.S.C. §119(a) on Patent Application No. 100118075 filed in Taiwan, R.O.C. on May 24, 2011, the entire contents of which are hereby incorporated by reference.

BACKGROUND OF THE INVENTION

1. Field of the Invention

The present invention relates to an image capturing lens assembly, and more particularly, to a compact image capturing lens assembly used in electronic products.

2. Description of the Prior Art

In the process of technical innovation, with the popularity of mobile phones equipped with camera, the demand for compact photographing lenses is increasing. Generally, the sensor of a general photographing camera is none other than CCD (Charge Coupled Device) or CMOS device (Complementary Metal Oxide Semiconductor device). Furthermore, advances in semiconductor manufacturing technology have allowed the pixel size of sensors to be reduced and therefore lead imaging lens assemblies to high resolution and to be even more compact. In the mean time, the demand for better image quality is increased.

A conventional compact photographing lens equipped in a portable electronic product, as the system with four lens elements disclosed in U.S. Pat. No. 7,355,801; wherein the invention is an image pickup lens assembly with a structure of three lens groups, wherein the third lens group thereof is configured with only one lens element and thereby the ability to correct aberration and chromatic aberration is not enough. However, due to the popularity of high standard mobile devices such as smart phones and PDAs (Personal Digital Assistant) driving the rapid improvements in high resolution and image quality of the current compact imaging lens systems, conventional four lens elements systems no longer satisfy the higher level camera modules. Furthermore, with the current trend for high performance and compact design in electronic products, the need for high image quality and a moderate total track length imaging optical lens assembly is very crucial in compact portable electronic products.

SUMMARY OF THE INVENTION

The present invention provides an image capturing lens assembly comprising, in order from an object side to an image side: a first lens element with positive refractive power having a convex object-side surface; a second lens element with negative refractive power; a third lens element with negative refractive power having a concave object-side surface; a fourth lens element having a concave object-side surface and a convex image-side surface; and a fifth lens element having a concave image-side surface, the object-side and image-side surfaces thereof being aspheric and at least one inflection point being formed on at least one of the object-side and image-side surfaces thereof; wherein a focal length of the image capturing lens assembly is f, a focal length of the third lens element is f3, a central thickness of the third lens element is CT3, a central thickness of the second lens element is CT2, a focal length of the second lens element is f2, and they satisfy the following relations: $-1.5 < f/f3 < -0.3$; $CT3/CT2 > 1.5$; and $0 < f2/f3$.

On the other hand, the present invention provides an image capturing lens assembly comprising, in order from an object side to an image side: a first lens element with positive refractive power having a convex object-side surface; a second lens element with negative refractive power; a third lens element with negative refractive power having a concave object-side surface; a fourth lens element with positive refractive power having a concave object-side surface and a convex image-side surface, and the fourth lens element is made of plastic; and a fifth lens element with negative refractive power having a concave object-side surface and a concave image-side surface, the object-side and image-side surfaces thereof being aspheric, at least one inflection point being formed on at least one of the object-side and image-side surfaces thereof, and the fifth lens element is made of plastic; wherein a focal length of the image capturing lens assembly is f, a focal length of the third lens element is f3, a central thickness of the third lens element is CT3, a central thickness of the second lens element is CT2, a focal length of the second lens element is f2, and they satisfy the following relations: $-1.5 < f/f3 < -0.3$; $CT3/CT2 > 1.5$; and $0 < f2/f3$.

By such arrangement, it can effectively reduce the aberration as well as the total track length of the imaging lens system for obtaining higher image resolution.

In the aforementioned image capturing lens assembly, the first lens element with positive refractive power provides the main refractive power of the system, and thereby the total track length thereof is reduced. When the second lens element has negative refractive power, the astigmatism of the system can be effectively corrected. When the third lens element has negative refractive power, and thereby the aberration of the system can be effectively corrected and the image quality thereof can be favorably improved. When the fourth lens element has positive refractive power, the total track length of the assembly can be effectively shortened and the sensitivity thereof can be also reduced. When the fifth lens element has negative refractive power, the high order aberration of the system can be effectively corrected.

In the aforementioned image capturing lens assembly, when the first lens element has a convex object-side surface, the positive refractive power of the lens elements can be strengthened and thereby the total track length of the assembly can be reduced even more. When the third lens element has a meniscus lens element, the aberration of the assembly can be corrected favorably for obtaining higher image quality. When the fourth lens element has a concave object-side surface and a convex image-side surface, the astigmatism of the assembly can be favorably corrected. When the fifth lens element has a concave image-side surface, the principle point can be positioned away from the image plane and thereby reducing the total track length of the assembly. When the fifth lens element has a concave object-side surface and a concave image-side surface, the Petzval Sum of the system can be effectively corrected, enabling the focal plane to become more flat near the periphery.

DETAILED DESCRIPTION OF THE PREFERRED EMBODIMENTS

Figure 1A:
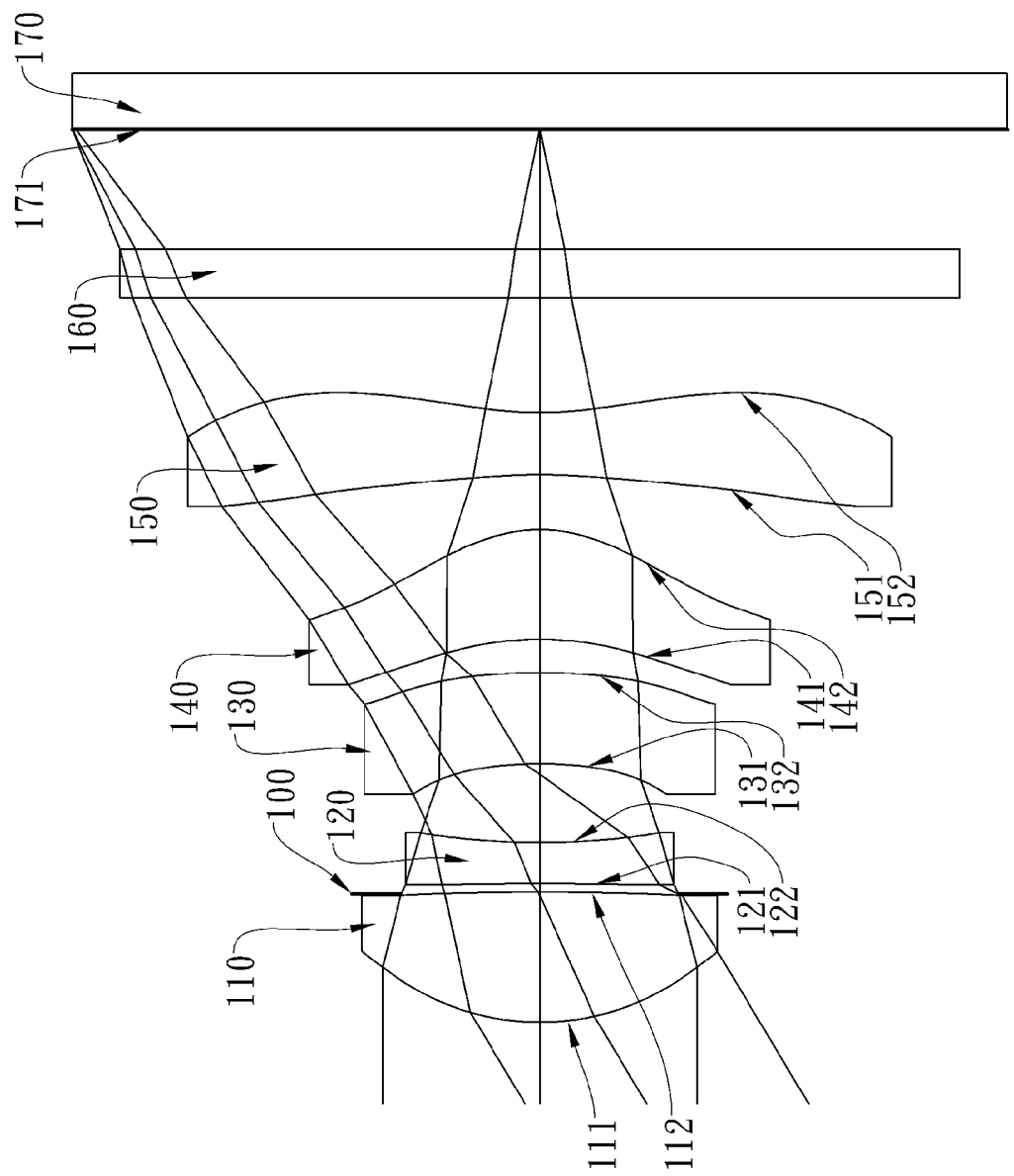
FIG. 1A shows an image capturing lens assembly in accordance with a first embodiment of the present invention.

The present invention provides an image capturing lens assembly comprising, in order from an object side to an image side: a first lens element with positive refractive power having a convex object-side surface; a second lens element with negative refractive power; a third lens element with negative refractive power having a concave object-side surface; a fourth lens element having a concave object-side surface and a convex image-side surface; and a fifth lens element having a concave image-side surface, the object-side and image-side surfaces thereof being aspheric and at least one inflection point being formed on at least one of the object-side and image-side surfaces thereof; wherein a focal length of the image capturing lens assembly is f, a focal length of the third lens element is f3, a central thickness of the third lens element is CT3, a central thickness of the second lens element is CT2, a focal length of the second lens element is f2, and they satisfy the following relations: $-1.5 < f/f3 < -0.3$; $CT3/CT2 > 1.5$; and $0 < f2/f3$.

When the relation of $-1.5 < f/f3 < -0.3$ is satisfied, the aberration of the lens assembly can be corrected by controlling the refractive power of the third lens element to improve the image quality; preferably, the following relation is satisfied: $-1.0 < f/f3 < -0.5$.

When the relation of $CT3/CT2 > 1.5$ is satisfied, the thickness of the second lens element and the third lens element is more proper for the assembly and space organization of the lens assembly.

When the relation of $0 < f2/f3$ is satisfied, the distribution of the negative refractive power of the second lens element and the third lens element is more proper for reducing the sensitivity and correcting the aberration of the assembly effectively; preferably, the following relation is satisfied: $0.35 < f2/f3 < 2.5$.

In the aforementioned image capturing lens assembly, a focal length of the fourth lens element is f4, a focal length of the fifth lens element is f5, and they preferably satisfy the following relation: $-1.2 < f4/f5 < -0.7$. When the above relation is satisfied, the distribution of the negative refractive power of the fifth lens element is more proper for correcting the aberration of the assembly effectively.

In the aforementioned image capturing lens assembly, an axial distance between the first lens element and the second lens element is T12, an axial distance between the second lens element and the third lens element is T23, and they preferably satisfy the following relation: $0.04 < T12/T23 < 0.40$. When the above relation is satisfied, the spacing between each lens element is more appropriate, which is favorable for the assembling and arrangement of the lens elements, and also favorable for a more efficient use of the space within the lens assembly, thereby keeping the lens assembly compact.

In the aforementioned image capturing lens assembly, a radius of the curvature of the object-side surface of the fourth lens element is R7, a radius of the curvature of the image-side surface of the fourth lens element is R8, and they preferably satisfy the following relation: $0.2 < (R7-R8)/(R7+R8) < 0.9$. When the above relation is satisfied, the fourth lens element is ensured to be a meniscus lens element so that the astigmatism produced by the lens assembly can be favorably corrected.

In the aforementioned image capturing lens assembly, an axial distance between the third lens element and the fourth lens element is T34, an axial distance between the fourth lens element and the fifth lens element is T45, and they preferably satisfy the following relation: $0.3 < T34/T45 < 0.85$. When the above relation is satisfied, the spacing between each lens element is more appropriate, which is favorable for the assembling and arrangement of the lens elements, and also favorable for a more efficient use of the space within the lens assembly, thereby keeping the lens assembly compact.

In the aforementioned image capturing lens assembly, the radius of the curvature of the image-side surface of the fourth lens element is R8, the focal length of the image capturing lens assembly is f, and they preferably satisfy the following relation: $-0.3 < R8/f < -0.1$. When the above relation is satisfied, the astigmatism of the system can be effectively corrected and the image quality thereof can be favorably improved.

In the aforementioned image capturing lens assembly, a radius of the curvature of the object-side surface of the fifth lens element is R9, a radius of the curvature of the image-side surface of the fifth lens element is R10, and they preferably satisfy the following relation: $-0.01 < (R9+R10)/(R9-R10) < 0.8$. When the above relation is satisfied, the astigmatism produced by the lens assembly can be favorably corrected.

In the aforementioned image capturing lens assembly, a radius of the curvature of the object-side surface of the first lens element is R1, a radius of the curvature of the image-side surface of the first lens element is R2, and they preferably satisfy the following relation: $-1.6 < (R1+R2)/(R1-R2) < -0.7$. When the above relation is satisfied, the spherical aberration of the first lens element can be favorably adjusted.

In the aforementioned image capturing lens assembly, the assembly further comprising a stop, an axial distance between the stop and the image-side surface of the fifth lens element is SD, an axial distance between an object-side surface of the first lens element and the image-side surface of the fifth lens element is TD, and they preferably satisfy the following relation: $0.65 < SD/TD < 0.97$. When the above relation is satisfied, a wide field of view can be favorably achieved.

In the aforementioned image capturing lens assembly, an Abbe number of the first lens element is V1, an Abbe number of the second lens element is V2, an Abbe number of the third lens element is V3, and they preferably satisfy the following relation: 0<V1−V2−V3<25. When the above relation is satisfied, the chromatic aberration of the assembly can be favorably corrected.

In the aforementioned image capturing lens assembly, the assembly further comprising an image sensor on an image plane; an axial distance between the object-side surface of the first lens element and the image plane is TTL, half of a diagonal length of an effective photosensitive area of the image sensor is ImgH, and they preferably satisfy the following relation: TTL/ImgH<2.0. When the above relation is satisfied, it is favorable for keeping the assembly compact for portable electronic products.

On the other hand, the present invention provides an image capturing lens assembly comprising, in order from an object side to an image side: a first lens element with positive refractive power having a convex object-side surface; a second lens element with negative refractive power; a third lens element with negative refractive power having a concave object-side surface; a fourth lens element with positive refractive power having a concave object-side surface and a convex image-side surface, and the fourth lens element is made of plastic; and a fifth lens element with negative refractive power having a concave object-side surface and a concave image-side surface, the object-side and image-side surfaces thereof being aspheric, at least one inflection point being formed on at least one of the object-side and image-side surfaces thereof, and the fifth lens element is made of plastic; wherein a focal length of the image capturing lens assembly is f, a focal length of the third lens element is f3, a central thickness of the third lens element is CT3, a central thickness of the second lens element is CT2, a focal length of the second lens element is f2, and they satisfy the following relations: −1.5<f/f3<−0.3; CT3/CT2>1.5; and 0<f2/f3.

When the relation of −1.5<f/f3<−0.3 is satisfied, the aberration of the lens assembly can be corrected by controlling the refractive power of the third lens element to improve the image quality.

When the relation of CT3/CT2>1.5 is satisfied, the thicknesses of the second lens element and the third lens element are more proper for the assembly and space organization of the lens assembly.

When the relation of 0<f2/f3 is satisfied, the distribution of the negative refractive power of the second lens element and the third lens element is more proper for reducing the sensitivity and correcting the aberration of the assembly effectively.

In the aforementioned image capturing lens assembly, a focal length of the fourth lens element is f4, a focal length of the fifth lens element is f5, and they preferably satisfy the following relation: −1.2<f4/f5<−0.7. When the above relation is satisfied, the distribution of the refractive power of the fifth lens element is more proper for reducing the sensitivity and correcting the aberration of the assembly effectively.

In the aforementioned image capturing lens assembly, an Abbe number of the first lens element is V1, an Abbe number of the second lens element is V2, an Abbe number of the third lens element is V3, and they preferably satisfy the following relation: 0<V1−V2−V3<25. When the above relation is satisfied, the chromatic aberration of the assembly can be favorably adjusted and corrected.

In the aforementioned image capturing lens assembly, a radius of the curvature of the image-side surface of the fourth lens element is R8, the focal length of the image capturing lens assembly is f, and they preferably satisfy the following relation: −0.3<R8/f. When the above relation is satisfied, the astigmatism of the system can be effectively corrected and the image quality thereof can be favorably improved.

In the aforementioned image capturing lens assembly, an axial distance between the third lens element and the fourth lens element is T34, an axial distance between the fourth lens element and the fifth lens element is T45, and they preferably satisfy the following relation: 0.3<T34/T45<0.85. When the above relation is satisfied, the spacing between each lens element is more appropriate, which is favorable for the assembling and arrangement of the lens elements, and also favorable for a more efficient use of the space within the lens assembly, thereby keeping the lens assembly compact.

In the aforementioned image capturing lens assembly, the lens elements can be made of glass or plastic material. If the lens elements are made of glass, the freedom for distributing the refractive power of the image capturing lens assembly can be increased. If plastic material is adopted to produce the lens elements, the production cost will be reduced effectively. Additionally, the surfaces of the lens elements can be aspheric and easily made into non-spherical profiles, allowing more design parameter freedom which can be used to reduce aberrations and the number of the lens elements used in an optical system. Consequently, the total track length of the image capturing lens assembly can be effectively reduced.

In the present image capturing lens assembly, if a lens element has a convex surface, it means the portion of the surface in proximity to the optical axis is convex; if a lens element has a concave surface, it means the portion of the surface in proximity to the optical axis is concave.

In the present image capturing lens assembly, there can be at least one stop, such as a glare stop or a field stop, provided for eliminating stray light and thereby promoting image resolution thereof.

Preferred embodiments of the present invention will be described in the following paragraphs by referring to the accompanying drawings.

Embodiment 1

Figure 1B:
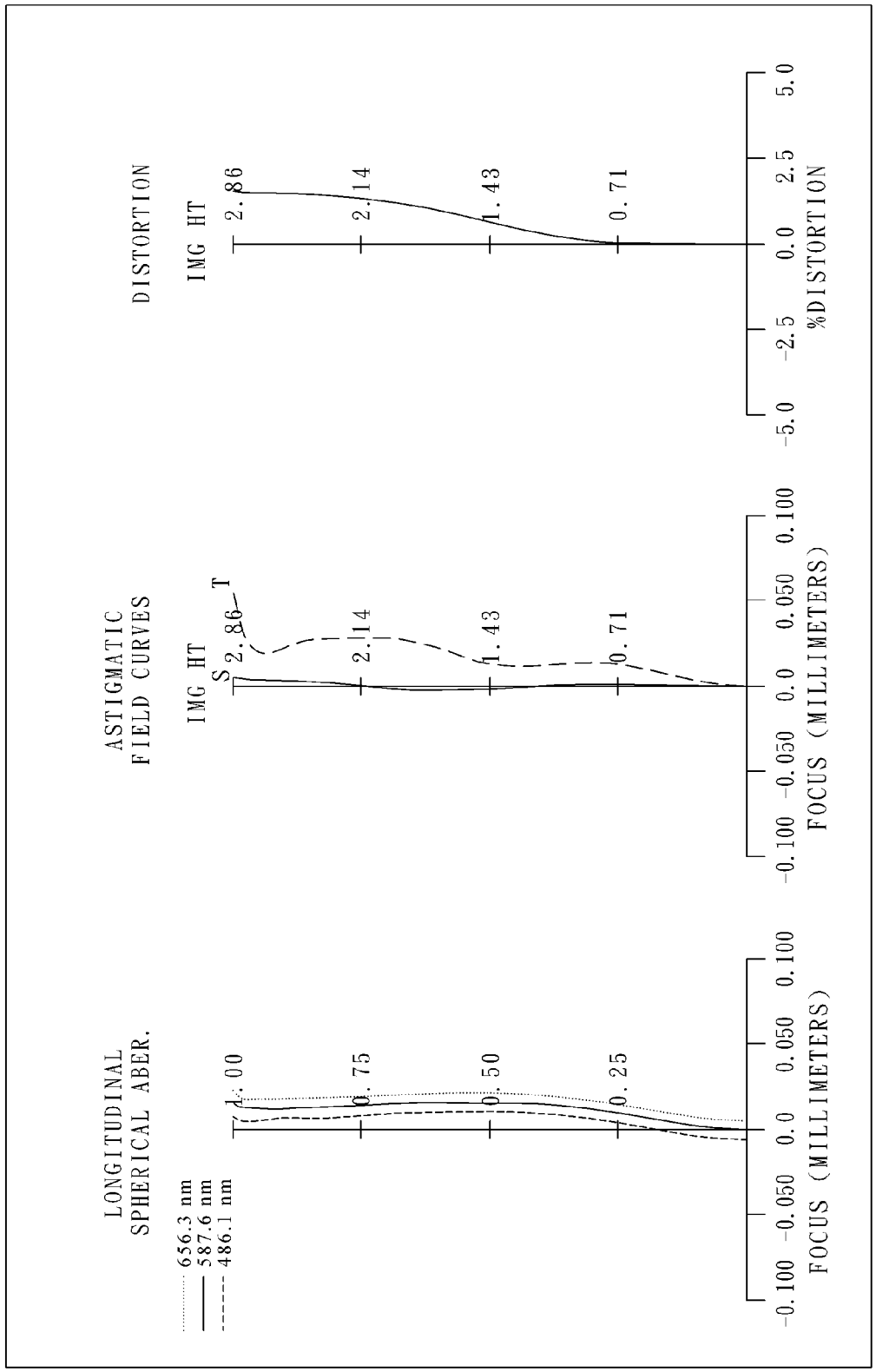
FIG. 1B shows the aberration curves of the first embodiment of the present invention.

FIG. 1A shows an image capturing lens assembly in accordance with the first embodiment of the present invention, and FIG. 1B shows the aberration curves of the first embodiment of the present invention. The image capturing lens assembly of the first embodiment of the present invention mainly comprises five lens elements, in order from an object side to an image side:

a first lens element 110 made of plastic with positive refractive power having a convex object-side surface 111 and a convex image-side surface 112, the object-side and image-side surfaces 111 and 112 thereof being aspheric;

a second lens element 120 made of plastic with negative refractive power having a concave object-side surface 121 and a concave image-side surface 122, the object-side and image-side surfaces 121 and 122 thereof being aspheric;

a third lens element 130 made of plastic with negative refractive power having a concave object-side surface 131 and a convex image-side surface 132, the object-side and image-side surfaces 131 and 132 thereof being aspheric;

a fourth lens element 140 made of plastic with positive refractive power having a concave object-side surface 141 and a convex image-side surface 142, the object-side and image-side surfaces 141 and 142 thereof being aspheric; and a fifth lens element 150 made of plastic with negative refractive power having a concave object-side surface 151 and a concave image-side surface 152, the object-side and image-side surfaces 151 and 152 thereof being aspheric, and at least one inflection point is formed on the image-side surface 152 thereof;

wherein an aperture stop 100 is disposed between the first lens element 110 and the second lens element 120;

the image capturing lens assembly further comprises an IR filter 160 disposed between the image-side surface 152 of the fifth lens element 150 and an image plane 171, and the IR filter 160 is made of glass and has no influence on the focal length of the image capturing lens assembly; the image capturing lens assembly further comprises an image sensor 170 provided on the image plane 171.

The detailed optical data of the first embodiment is shown in TABLE 1, and the aspheric surface data is shown in TABLE 2, wherein the units of the radius of curvature, the thickness and the focal length are expressed in mm, and HFOV is half of the maximal field of view.

TABLE 1

(Embodiment 1)
f = 4.71 mm, Fno = 2.45, HFOV = 30.8 deg.

| Surface # | | Curvature Radius | Thickness | Material | Index | Abbe # | Focal length |
|---|---|---|---|---|---|---|---|
| 0 | Object | Plano | Infinity | | | | |
| 1 | Lens 1 | 1.537390 (ASP) | 0.797 | Plastic | 1.544 | 55.9 | 2.63 |
| 2 | | −16.637700 (ASP) | −0.012 | | | | |
| 3 | Ape. Stop | Plano | 0.062 | | | | |
| 4 | Lens 2 | −25.000000 (ASP) | 0.250 | Plastic | 1.634 | 23.8 | −5.80 |
| 5 | | 4.329100 (ASP) | 0.483 | | | | |
| 6 | Lens 3 | −2.619240 (ASP) | 0.556 | Plastic | 1.634 | 23.8 | −11.37 |
| 7 | | −4.453400 (ASP) | 0.206 | | | | |
| 8 | Lens 4 | −1.910000 (ASP) | 0.671 | Plastic | 1.544 | 55.9 | 2.45 |
| 9 | | −0.882770 (ASP) | 0.336 | | | | |
| 10 | Lens 5 | −3.464900 (ASP) | 0.380 | Plastic | 1.530 | 55.8 | −2.47 |
| 11 | | 2.186480 (ASP) | 0.700 | | | | |
| 12 | IR-filter | Plano | 0.300 | Glass | 1.517 | 64.2 | — |
| 13 | | Plano | 0.729 | | | | |
| 14 | Image | Plano | — | | | | |

*Reference wavelength is d-line 587.6 nm

Effective radius of surface 11 (Stop) is 2.15 mm

TABLE 2

Aspheric Coefficients

| Surface # | 1 | 2 | 4 | 5 | 6 |
|---|---|---|---|---|---|
| k = | −5.92801E+00 | −5.00000E+01 | −2.04669E−14 | −1.98838E+01 | −1.24756E+00 |
| A4 = | 2.02214E−01 | −3.65441E−04 | −9.90794E−03 | 5.94172E−03 | −1.75802E−01 |
| A6 = | −1.35253E−01 | 6.10674E−02 | 4.35845E−02 | −2.16465E−02 | −7.84503E−02 |
| A8 = | 1.15076E−01 | −1.57861E−01 | 1.16899E−01 | 2.41431E−01 | 8.54835E−02 |
| A10 = | −6.87204E−02 | 1.72636E−01 | −4.16461E−01 | −4.81951E−01 | −7.26035E−02 |
| A12 = | 3.14053E−02 | −1.35006E−01 | 4.86323E−01 | 4.20328E−01 | 7.17985E−02 |
| A14 = | −1.44736E−02 | 5.45873E−02 | −1.73762E−01 | −6.09037E−02 | |

| Surface # | 7 | 8 | 9 | 10 | 11 |
|---|---|---|---|---|---|
| k = | −3.49183E−01 | 6.27301E−01 | −2.98637E+00 | −5.00000E+01 | −1.81191E+01 |
| A4 = | −8.95352E−02 | −1.63293E−02 | −1.01288E−01 | 3.88577E−02 | −4.35612E−02 |
| A6 = | −1.94835E−03 | 1.97902E−01 | 1.55767E−01 | −3.60052E−02 | 1.17905E−02 |
| A8 = | 6.44587E−02 | −1.74082E−01 | −7.36168E−02 | 1.15951E−02 | −4.53343E−03 |
| A10 = | −6.28067E−02 | 1.20971E−01 | 2.66609E−02 | −9.24850E−04 | 1.04319E−03 |
| A12 = | 3.22769E−02 | −7.12512E−02 | −1.02812E−02 | −1.89115E−04 | −1.13806E−04 |
| A14 = | | 2.04461E−02 | 1.86022E−03 | 2.79382E−05 | 4.15334E−06 |

The equation of the aspheric surface profiles is expressed as follows:

$$X(Y)=(Y^2/R)/(1+\text{sqrt}(1-(1+k)*(Y/R)^2))+\Sigma_i(Ai)*(Y^i)$$

wherein:

X: the height of a point on the aspheric surface at a distance Y from the optical axis relative to the tangential plane at the aspheric surface vertex;

Y: the distance from the point on the curve of the aspheric surface to the optical axis;

k: the conic coefficient;

Ai: the aspheric coefficient of order i.

In the first embodiment of the present image capturing lens assembly, the focal length of the image capturing lens assembly is f, and it satisfies the following relation: f=4.71 (mm).

In the first embodiment of the present image capturing lens assembly, the f-number of the image capturing lens assembly is Fno, and it satisfies the relation: Fno=2.45.

In the first embodiment of the present image capturing lens assembly, half of the maximal field of view of the image capturing lens assembly is HFOV, and it satisfies the relation: HFOV=30.8 deg.

In the first embodiment of the present image capturing lens assembly, an Abbe number of the first lens element 110 is V1, an Abbe number of the second lens element 120 is V2, an Abbe number of the third lens element 130 is V3, and they satisfy the relation: V1−V2−V3=8.30.

In the first embodiment of the present image capturing lens assembly, an axial distance between the first lens element 110 and the second lens element 120 is T12, an axial distance between the second lens element 120 and the third lens element 130 is T23, and they satisfy the relation: T12/T23=0.10.

In the first embodiment of the present image capturing lens assembly, an axial distance between the third lens element 130 and the fourth lens element 140 is T34, an axial distance between the fourth lens element 140 and the fifth lens element 150 is T45, and they satisfy the relation: T34/T45=0.61.

In the first embodiment of the present image capturing lens assembly, a central thickness of the third lens element 130 is CT3, a central thickness of the second lens element 120 is CT2, and they satisfy the relation: CT3/CT2=2.22.

In the first embodiment of the present image capturing lens assembly, a radius of the curvature of the object-side surface 111 of the first lens element 110 is R1, a radius of the curvature of the object-side surface 112 of the first lens element 110 is R2, and they satisfy the following relation: (R1+R2)/(R1−R2)=−0.83.

In the first embodiment of the present image capturing lens assembly, a radius of the curvature of the object-side surface 141 of the fourth lens element 140 is R7, a radius of the curvature of the image-side surface 142 of the fourth lens element 140 is R8, and they satisfy the following relation: (R7−R8)/(R7+R8)=0.37.

In the first embodiment of the present image capturing lens assembly, a radius of the curvature of the object-side surface 151 of the fifth lens element 150 is R9, a radius of the curvature of the image-side surface 152 of the fifth lens element 150 is R10, and they satisfy the following relation: (R9+R10)/(R9−R10)=0.23.

In the first embodiment of the present image capturing lens assembly, the radius of the curvature of the image-side surface 142 of the fourth lens element 140 is R8, the focal length of the image capturing lens assembly is f, and they satisfy the following relation: R8/f=−0.19.

In the first embodiment of the present image capturing lens assembly, the focal length of the image capturing lens assembly is f, the focal length of the third lens element 130 is f3, and they satisfy the following relation: f/f3=−0.41.

In the first embodiment of the present image capturing lens assembly, the focal length of the second lens element 120 is f2, the focal length of the third lens element 130 is f3, and they satisfy the following relation: f2/f3=0.51.

In the first embodiment of the present image capturing lens assembly, a focal length of the fourth lens element 140 is f4, a focal length of the fifth lens element 150 is f5, and they satisfy the following relation: f4/f5=−0.99.

In the first embodiment of the present image capturing lens assembly, an axial distance between the aperture stop 100 and the image-side surface 152 of the fifth lens element 150 is SD, an axial distance between an object-side surface 111 of the first lens element 110 and the image-side surface 152 of the fifth lens element 150 is TD, and they satisfy the following relation: SD/TD=0.79.

In the first embodiment of the present image capturing lens assembly, the axial distance between the object-side surface 111 of the first lens element 110 and the image plane 171 is TTL, half of the diagonal length of the effective photosensitive area of the image sensor 170 is ImgH, and they satisfy the following relation: TTL/ImgH=1.88.

Embodiment 2

Figure 2A:
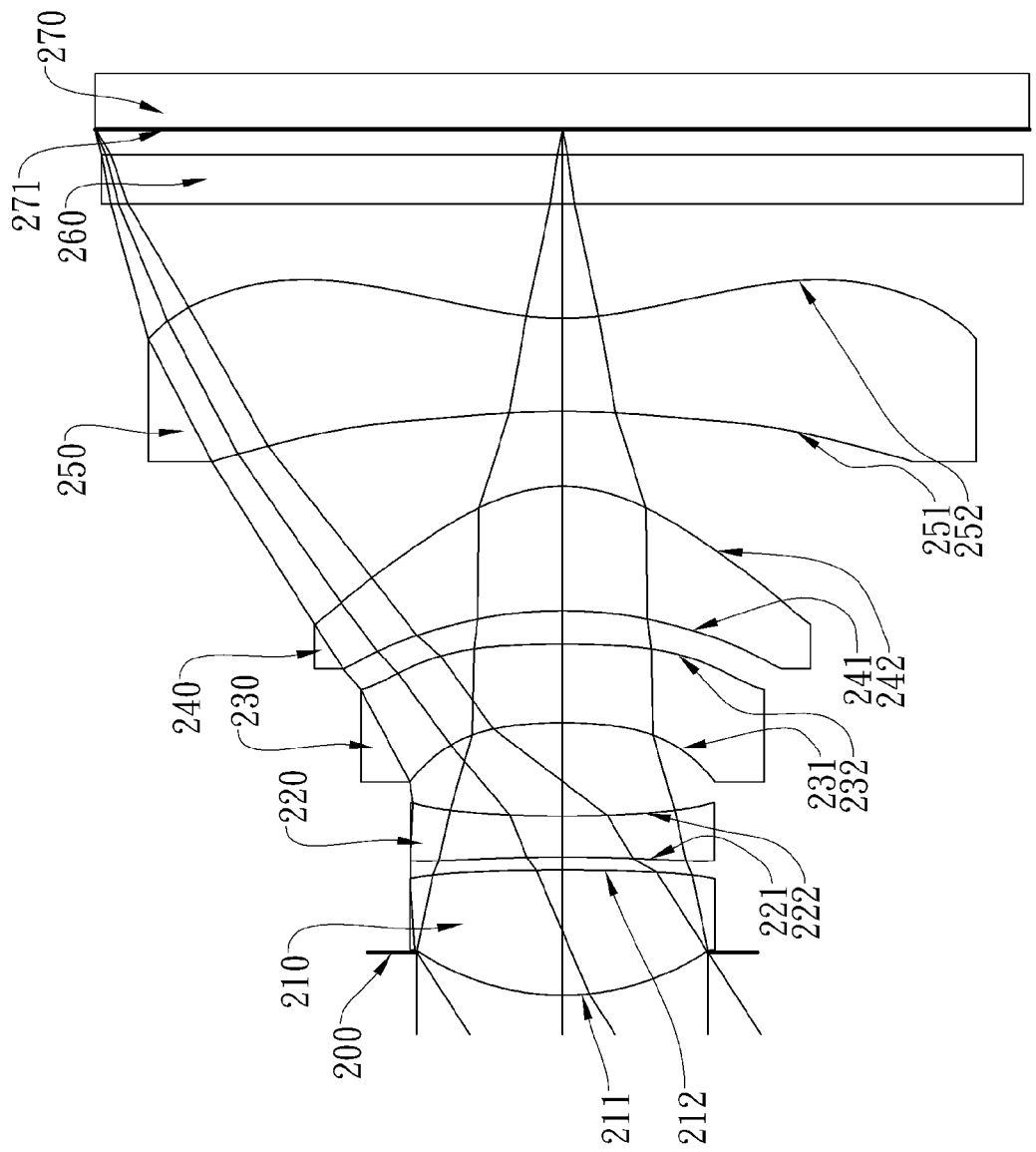
FIG. 2A shows an image capturing lens assembly in accordance with a second embodiment of the present invention.
Figure 2B:
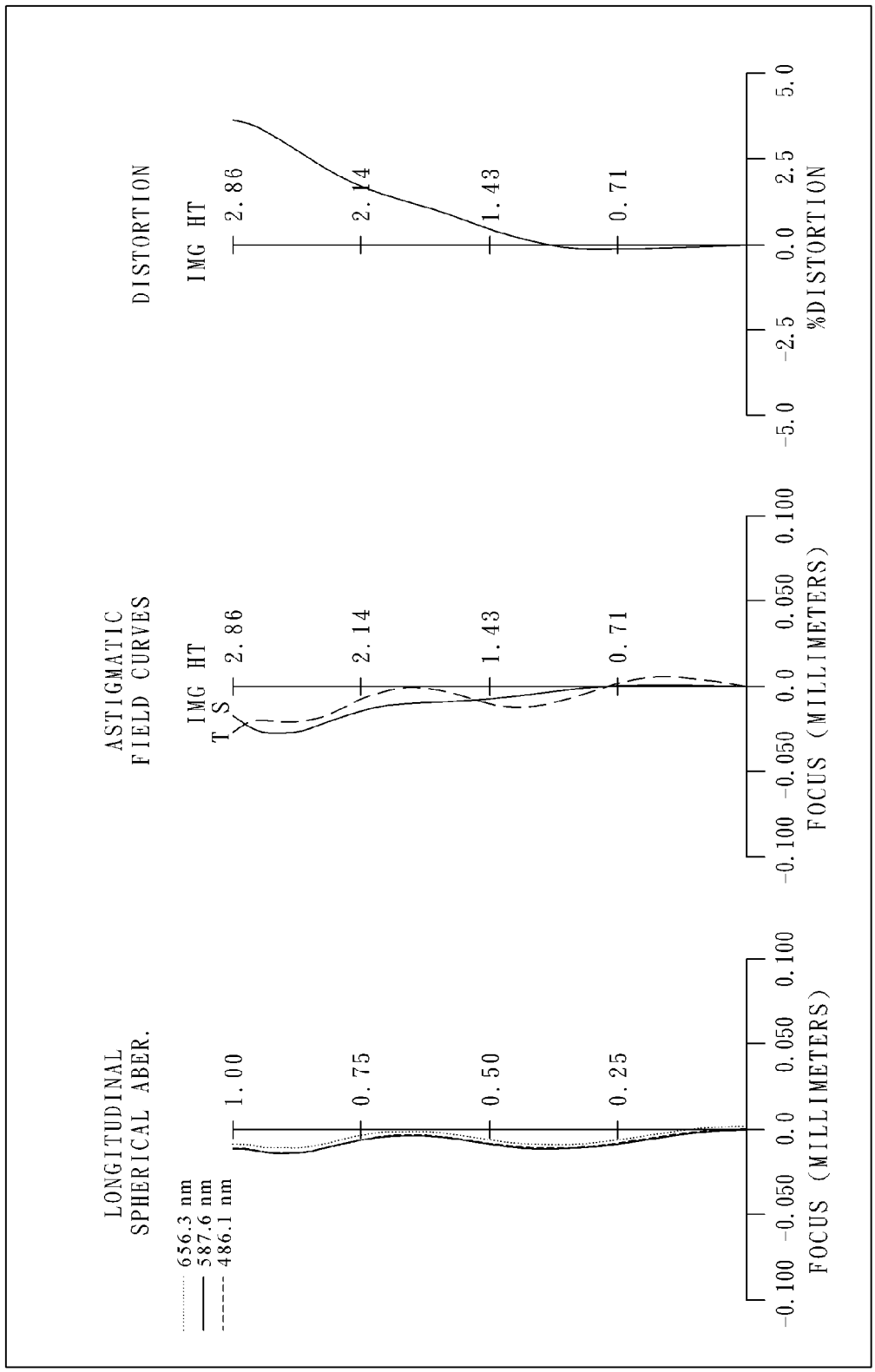
FIG. 2B shows the aberration curves of the second embodiment of the present invention.

FIG. 2A shows an image capturing lens assembly in accordance with the second embodiment of the present invention, and FIG. 2B shows the aberration curves of the second embodiment of the present invention. The image capturing lens assembly of the second embodiment of the present invention mainly comprises five lens elements, in order from an object side to an image side:

a first lens element 210 made of plastic with positive refractive power having a convex object-side surface 211 and a convex image-side surface 212, the object-side and image-side surfaces 211 and 212 thereof being aspheric;

a second lens element 220 made of plastic with negative refractive power having a concave object-side surface 221 and a concave image-side surface 222, the object-side and image-side surfaces 221 and 222 thereof being aspheric;

a third lens element 230 made of plastic with negative refractive power having a concave object-side surface 231 and a convex image-side surface 232, the object-side and image-side surfaces 231 and 232 thereof being aspheric;

a fourth lens element 240 made of plastic with positive refractive power having a concave object-side surface 241 and a convex image-side surface 242, the object-side and image-side surfaces 241 and 242 thereof being aspheric; and a fifth lens element 250 made of plastic with negative refractive power having a concave object-side surface 251 and a concave image-side surface 252, the object-side and image-side surfaces 251 and 252 thereof being aspheric, and at least one inflection point is formed on the image-side surface 252 thereof;

wherein an aperture stop 200 is disposed between the imaged object and the first lens element 210;

the image capturing lens assembly further comprises an IR filter 260 disposed between the image-side surface 252 of the fifth lens element 250 and an image plane 271, and the IR filter 260 is made of glass and has no influence on the focal length of the image capturing lens assembly; the image capturing lens assembly further comprises an image sensor 270 provided on the image plane 271.

The detailed optical data of the second embodiment is shown in TABLE 3, and the aspheric surface data is shown in TABLE 4, wherein the units of the radius of curvature, the thickness and the focal length are expressed in mm, and HFOV is half of the maximal field of view.

TABLE 3

(Embodiment 2)
f = 4.27 mm, Fno = 2.40, HFOV = 32.9 deg.

| Surface # | | Curvature Radius | Thickness | Material | Index | Abbe # | Focal length |
|---|---|---|---|---|---|---|---|
| 0 | Object | Plano | Infinity | | | | |
| 1 | Ape. Stop | Plano | −0.260 | | | | |
| 2 | Lens 1 | 1.585300 (ASP) | 0.765 | Plastic | 1.535 | 56.3 | 2.69 |
| 3 | | −12.801800 (ASP) | 0.079 | | | | |
| 4 | Lens 2 | −9.815900 (ASP) | 0.250 | Plastic | 1.633 | 23.4 | −6.11 |
| 5 | | 6.440300 (ASP) | 0.571 | | | | |
| 6 | Lens 3 | −3.054700 (ASP) | 0.480 | Plastic | 1.633 | 23.4 | −6.97 |
| 7 | | −10.544500 (ASP) | 0.205 | | | | |
| 8 | Lens 4 | −2.799350 (ASP) | 0.761 | Plastic | 1.535 | 56.3 | 2.29 |
| 9 | | −0.931780 (ASP) | 0.459 | | | | |
| 10 | Lens 5 | −4.601100 (ASP) | 0.570 | Plastic | 1.535 | 56.3 | −2.36 |
| 11 | | 1.816270 (ASP) | 0.700 | | | | |
| 12 | IR-filter | Plano | 0.300 | Glass | 1.517 | 64.2 | — |
| 13 | | Plano | 0.153 | | | | |
| 14 | Image | Plano | — | | | | |

* Reference wavelength is d-line 587.6 nm

TABLE 4

Aspheric Coefficients

| Surface # | 2 | 3 | 4 | 5 | 6 |
|---|---|---|---|---|---|
| k = | −5.96439E+00 | −1.27430E+01 | −7.61160E+01 | −1.80540E+01 | 1.00000E+00 |
| A4 = | 1.88481E−01 | −7.18994E−03 | −3.95357E−03 | −1.32548E−02 | −2.42877E−01 |
| A6 = | −1.33111E−01 | 5.80480E−02 | 1.62868E−02 | 8.94602E−02 | −9.36136E−02 |
| A8 = | 1.14492E−01 | −1.86677E−01 | 1.25411E−01 | −2.11674E−01 | 1.07485E−01 |
| A10 = | −7.34828E−02 | 1.95167E−01 | −3.73918E−01 | 4.72995E−01 | −3.80119E−02 |
| A12 = | 3.35452E−02 | −1.26863E−01 | 3.91886E−01 | −5.66713E−01 | −2.14114E−02 |
| A14 = | −2.00989E−02 | 3.49646E−02 | −1.23665E−01 | 2.91230E−01 | |

| Surface # | 7 | 8 | 9 | 10 | 11 |
|---|---|---|---|---|---|
| k = | 1.00000E+00 | 2.80205E+00 | −2.65025E+00 | −1.29159E+01 | −1.05451E+01 |
| A4 = | −1.63651E−01 | −5.23742E−02 | −1.18345E−01 | 6.89685E−02 | −2.60282E−02 |
| A6 = | 1.27586E−03 | 1.59265E−01 | 1.31882E−01 | −4.66887E−02 | 8.55299E−03 |
| A8 = | 7.26913E−02 | −1.68078E−01 | −7.44531E−02 | 1.11175E−02 | −4.25612E−03 |
| A10 = | −5.72193E−02 | 1.29957E−01 | 2.84052E−02 | −5.89653E−04 | 9.81447E−04 |
| A12 = | 1.99457E−02 | −6.80654E−02 | −9.76487E−03 | −1.34402E−04 | −1.00996E−04 |
| A14 = | | 1.60770E−02 | 1.81864E−03 | 1.44732E−05 | 3.61699E−06 |

The equation of the aspheric surface profiles of the second embodiment has the same form as that of the first embodiment. Moreover, the description of the factors in the relations is as those set forth in the first embodiment, but the values of the relations of the second embodiment are listed in the following TABLE 5.

TABLE 5

(Embodiment 2)

| f | 4.27 | (R7 − R8)/(R7 + R8) | 0.50 |
|---|---|---|---|
| Fno | 2.40 | (R9 + R10)/(R9 − R10) | 0.43 |
| HFOV | 32.9 | R8/f | −0.22 |
| V1−V2−V3 | 9.50 | f/f3 | −0.61 |
| T12/T23 | 0.14 | f2/f3 | 0.88 |
| T34/T45 | 0.45 | f4/f5 | −0.97 |
| CT3/CT2 | 1.92 | SD/TD | 0.94 |
| (R1 + R2)/(R1 − R2) | −0.78 | TTL/ImgH | 1.82 |

Embodiment 3

Figure 3A:
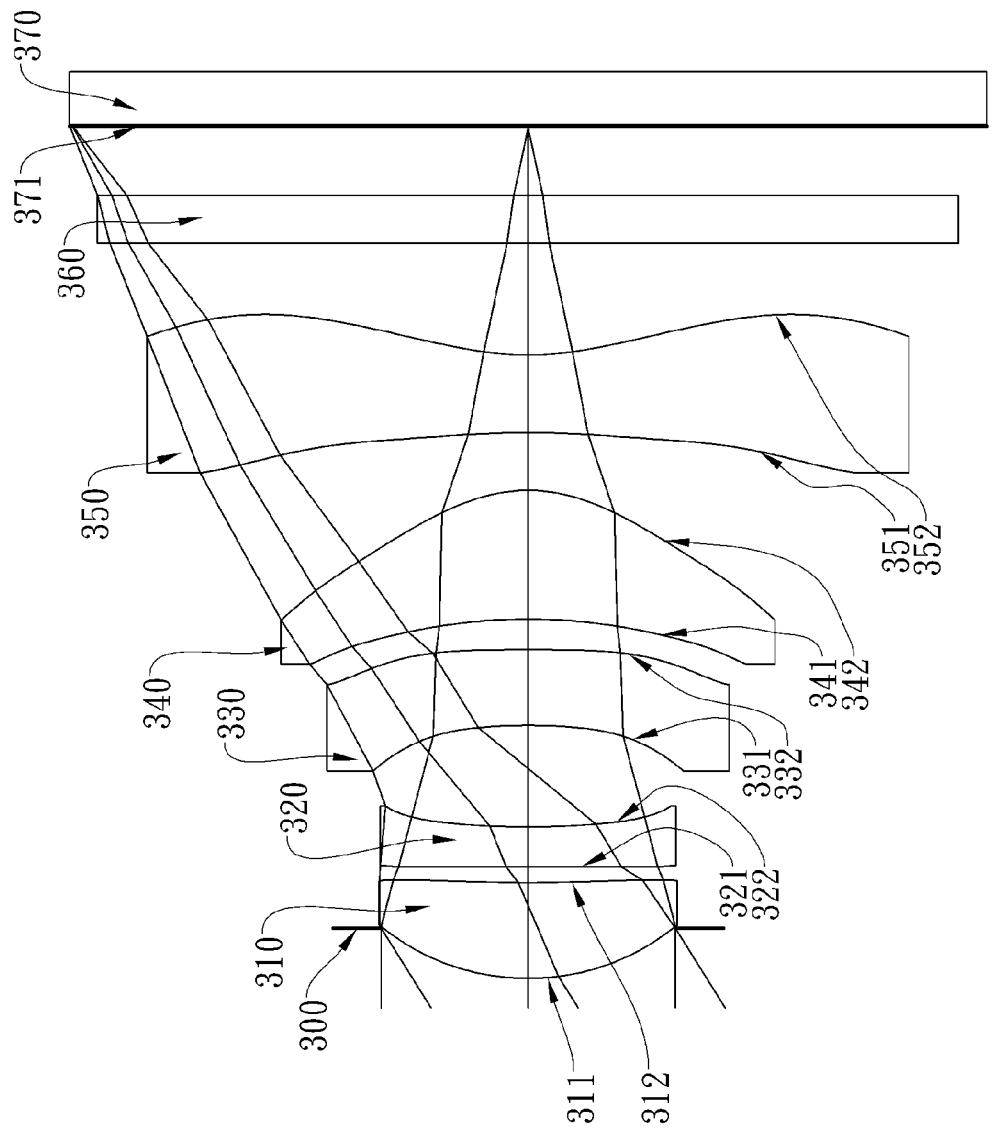
FIG. 3A shows an image capturing lens assembly in accordance with a third embodiment of the present invention.
Figure 3B:
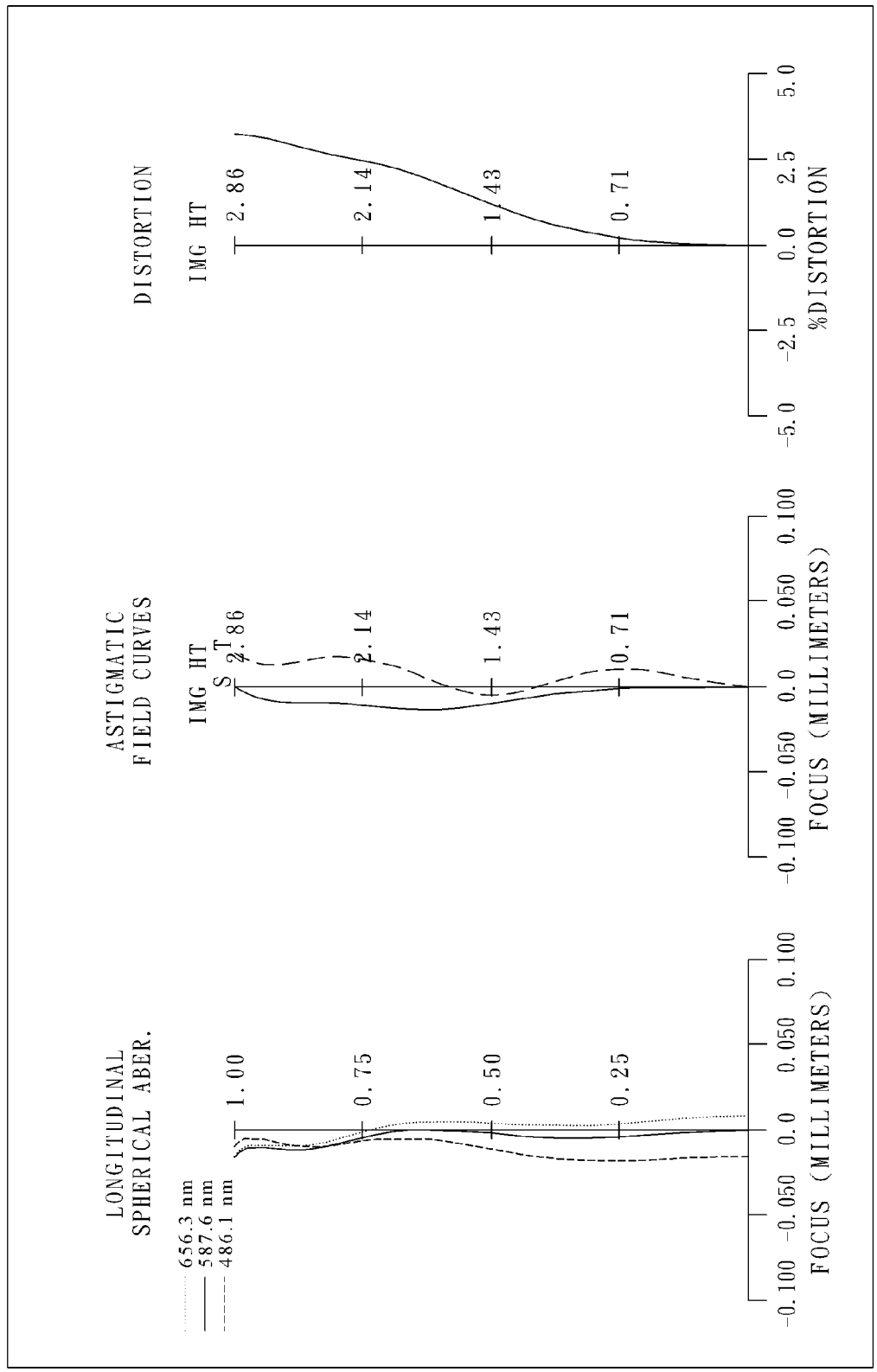
FIG. 3B shows the aberration curves of the third embodiment of the present invention.

FIG. 3A shows an image capturing lens assembly in accordance with the third embodiment of the present invention, and FIG. 3B shows the aberration curves of the third embodiment of the present invention. The image capturing lens assembly of the third embodiment of the present invention mainly comprises five lens elements, in order from an object side to an image side:

a first lens element 310 made of plastic with positive refractive power having a convex object-side surface 311 and a concave image-side surface 312, the object-side and image-side surfaces 311 and 312 thereof being aspheric;

a second lens element 320 made of plastic with negative refractive power having a convex object-side surface 321 and a concave image-side surface 322, the object-side and image-side surfaces 321 and 322 thereof being aspheric;

a third lens element 330 made of plastic with negative refractive power having a concave object-side surface 331 and a convex image-side surface 332, the object-side and image-side surfaces 331 and 332 thereof being aspheric;

a fourth lens element 340 made of plastic with positive refractive power having a concave object-side surface 341 and a convex image-side surface 342, the object-side and image-side surfaces 341 and 342 thereof being aspheric; and a fifth lens element 350 made of plastic with negative refractive power having a concave object-side surface 351 and a concave image-side surface 352, the object-side and image-side surfaces 351 and 352 thereof being aspheric, and at least one inflection point is formed on the image-side surface 352 thereof;

wherein an aperture stop 300 is disposed between the imaged object and the first lens element 310;

the image capturing lens assembly further comprises an IR filter 360 disposed between the image-side surface 352 of the fifth lens element 350 and an image plane 371, and the IR filter 360 is made of glass and has no influence on the focal length of the image capturing lens assembly; the image capturing lens assembly further comprises an image sensor 370 provided on the image plane 371.

The detailed optical data of the third embodiment is shown in TABLE 6, and the aspheric surface data is shown in TABLE 7, wherein the units of the radius of curvature, the thickness and the focal length are expressed in mm, and HFOV is half of the maximal field of view.

TABLE 6

(Embodiment 3)
f = 4.42 mm, Fno = 2.40, HFOV = 32.1 deg.

| Surface # | | Curvature Radius | Thickness | Material | Index | Abbe # | Focal length |
|---|---|---|---|---|---|---|---|
| 0 | Object | Plano | Infinity | | | | |
| 1 | Ape. Stop | Plano | −0.315 | | | | |
| 2 | Lens 1 | 1.489420 (ASP) | 0.599 | Plastic | 1.535 | 56.3 | 3.29 |
| 3 | | 8.333300 (ASP) | 0.100 | | | | |
| 4 | Lens 2 | 20.777200 (ASP) | 0.250 | Plastic | 1.633 | 23.4 | −9.86 |
| 5 | | 4.777600 (ASP) | 0.636 | | | | |
| 6 | Lens 3 | −4.287800 (ASP) | 0.475 | Plastic | 1.614 | 25.6 | −7.69 |
| 7 | | −48.765200 (ASP) | 0.192 | | | | |
| 8 | Lens 4 | −3.862900 (ASP) | 0.808 | Plastic | 1.530 | 55.8 | 2.19 |
| 9 | | −0.957440 (ASP) | 0.362 | | | | |
| 10 | Lens 5 | −5.132300 (ASP) | 0.486 | Plastic | 1.530 | 55.8 | −2.39 |
| 11 | | 1.740100 (ASP) | 0.700 | | | | |
| 12 | IR-filter | Plano | 0.300 | Glass | 1.517 | 64.2 | — |
| 13 | | Plano | 0.436 | | | | |
| 14 | Image | Plano | — | | | | |

* Reference wavelength is d-line 587.6 nm

TABLE 7

Aspheric Coefficients

| Surface # | 2 | 3 | 4 | 5 | 6 |
|---|---|---|---|---|---|
| k = | −5.43316E+00 | −5.00000E+01 | −9.00000E+01 | −2.00000E+01 | −1.57689E+01 |
| A4 = | 2.09826E−01 | −6.82228E−02 | −1.12623E−01 | −2.75709E−02 | −2.19970E−01 |
| A6 = | −1.23877E−01 | 9.00162E−02 | 1.05098E−01 | 1.59078E−01 | −6.31672E−02 |
| A8 = | 1.04158E−01 | −1.49016E−01 | 1.57016E−01 | −1.67069E−01 | 1.13046E−01 |
| A10 = | −6.93311E−02 | 1.92211E−01 | −3.85361E−01 | 4.38014E−01 | −4.61643E−02 |
| A12 = | 5.89462E−02 | −1.37586E−01 | 3.53071E−01 | −5.71577E−01 | 6.99550E−03 |
| A14 = | −3.75258E−02 | 2.53828E−02 | −1.17723E−01 | 3.34992E−01 | |

| Surface # | 7 | 8 | 9 | 10 | 11 |
|---|---|---|---|---|---|
| k = | 1.00000E+00 | 6.03172E+00 | −2.87618E+00 | 7.77251E−01 | −1.02762E+01 |
| A4 = | −1.39385E−01 | −5.62384E−02 | −9.76664E−02 | 7.95888E−02 | −2.25045E−02 |
| A6 = | −1.29604E−02 | 1.56470E−01 | 1.21991E−01 | −4.67160E−02 | 6.37743E−03 |
| A8 = | 7.39867E−02 | −1.70443E−01 | −7.18762E−02 | 1.04932E−02 | −3.39644E−03 |
| A10 = | −5.04693E−02 | 1.31283E−01 | 2.98528E−02 | −5.29507E−04 | 8.81307E−04 |
| A12 = | 1.49014E−02 | −6.49507E−02 | −1.03365E−02 | −1.07754E−04 | −1.05585E−04 |
| A14 = | | 2.04461E−02 | 1.86022E−03 | 2.79382E−05 | 4.15334E−06 |

The equation of the aspheric surface profiles of the third embodiment has the same form as that of the first embodiment. Moreover, the description of the factors in the relations is as those set forth in the first embodiment, but the values of the relations of the third embodiment are listed in the following TABLE 8.

TABLE 8

(Embodiment 3)

| f | 4.42 | (R7 − R8)/(R7 + R8) | 0.60 |
|---|---|---|---|
| Fno | 2.40 | (R9 + R10)/(R9 − R10) | 0.49 |
| HFOV | 32.1 | R8/f | −0.22 |
| V1-V2-V3 | 7.30 | f/f3 | −0.58 |
| T12/T23 | 0.16 | f2/f3 | 1.28 |
| T34/T45 | 0.53 | f4/f5 | −0.92 |
| CT3/CT2 | 1.90 | SD/TD | 0.92 |
| (R1 + R2)/(R1 − R2) | −1.44 | TTL/ImgH | 1.84 |

Embodiment 4

Figure 4A:
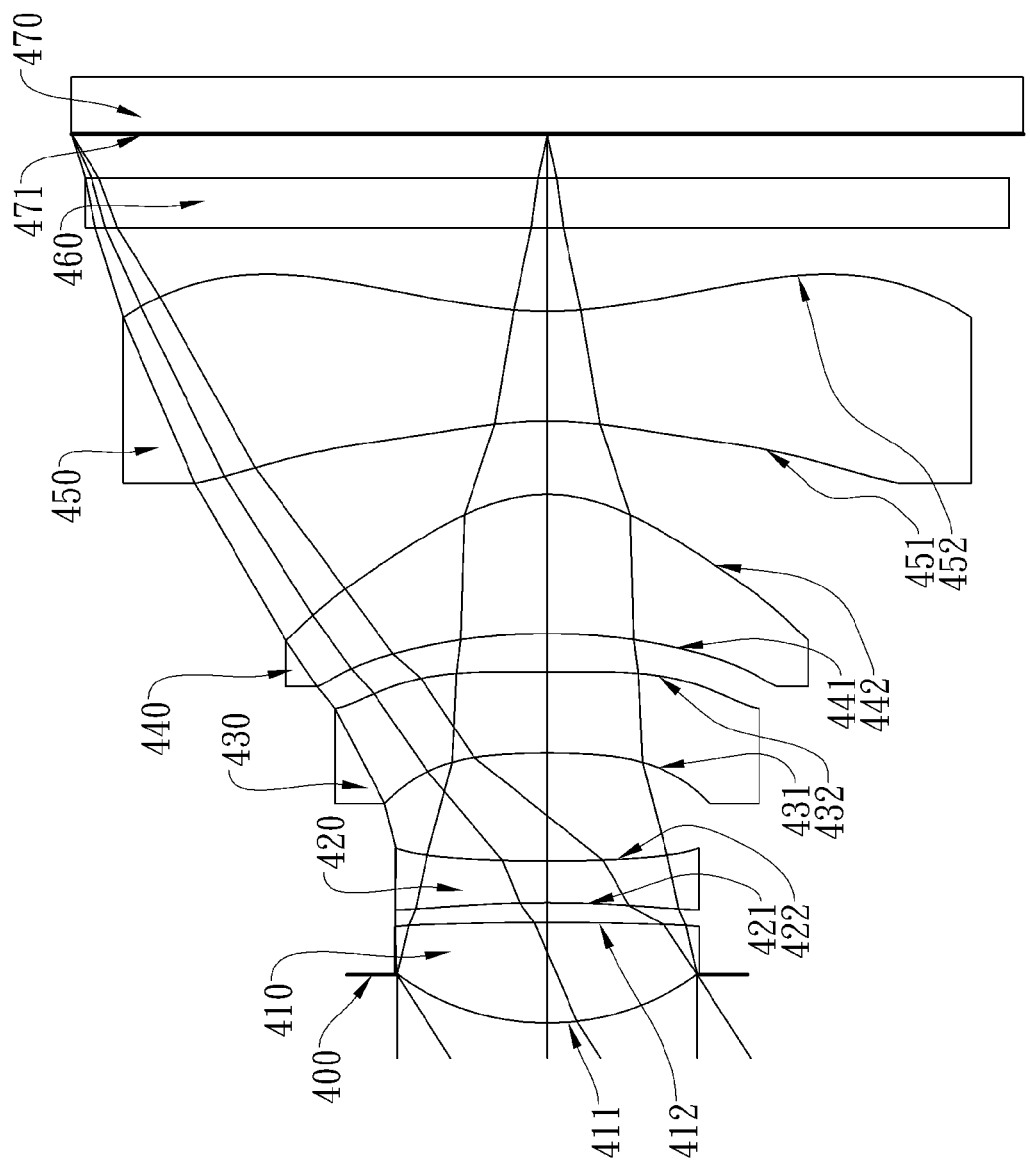
FIG. 4A shows an image capturing lens assembly in accordance with a fourth embodiment of the present invention.
Figure 4B:
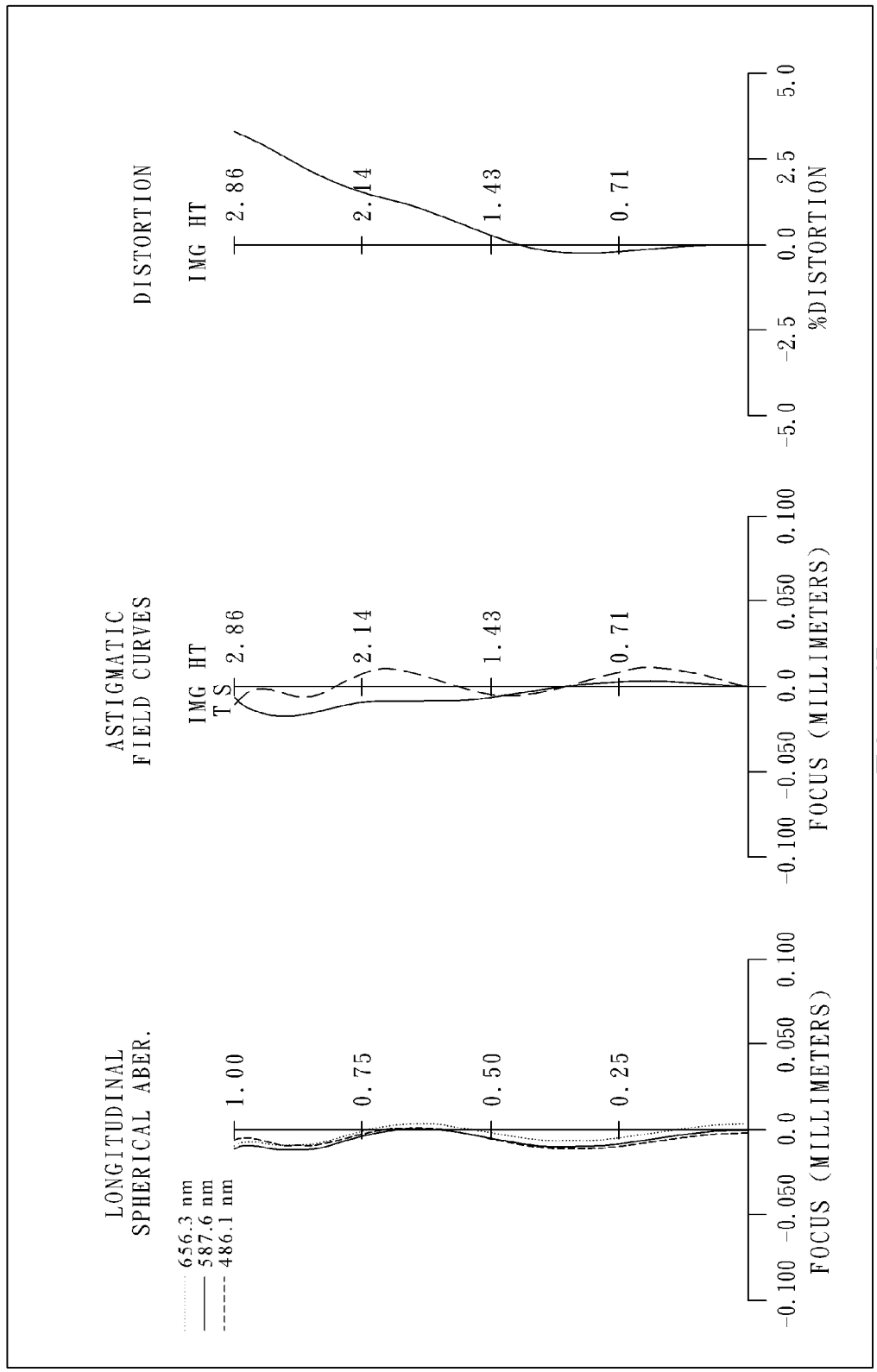
FIG. 4B shows the aberration curves of the fourth embodiment of the present invention.

FIG. 4A shows an image capturing lens assembly in accordance with the fourth embodiment of the present invention, and FIG. 4B shows the aberration curves of the fourth embodiment of the present invention. The image capturing lens assembly of the fourth embodiment of the present invention mainly comprises five lens elements, in order from an object side to an image side:

a first lens element 410 made of plastic with positive refractive power having a convex object-side surface 411 and a convex image-side surface 412, the object-side and image-side surfaces 411 and 412 thereof being aspheric;

a second lens element 420 made of plastic with negative refractive power having a concave object-side surface 421 and a concave image-side surface 422, the object-side and image-side surfaces 421 and 422 thereof being aspheric;

a third lens element 430 made of plastic with negative refractive power having a concave object-side surface 431 and a concave image-side surface 432, the object-side and image-side surfaces 431 and 432 thereof being aspheric, and at least one inflection point is formed on the image-side surface 432 thereof;

a fourth lens element 440 made of plastic with positive refractive power having a concave object-side surface 441 and a convex image-side surface 442, the object-side and image-side surfaces 441 and 442 thereof being aspheric; and a fifth lens element 450 made of plastic with negative refractive power having a concave object-side surface 451 and a concave image-side surface 452, the object-side and image-side surfaces 451 and 452 thereof being aspheric, and at least one inflection point is formed on the image-side surface 452 thereof;

wherein an aperture stop 400 is disposed between the imaged object and the first lens element 410;

the image capturing lens assembly further comprises an IR filter 460 disposed between the image-side surface 452 of the fifth lens element 450 and an image plane 471, and the IR filter 460 is made of glass and has no influence on the focal length of the image capturing lens assembly; the image capturing lens assembly further comprises an image sensor 470 provided on the image plane 471.

The detailed optical data of the fourth embodiment is shown in TABLE 9, and the aspheric surface data is shown in TABLE 10, wherein the units of the radius of curvature, the thickness and the focal length are expressed in mm, and HFOV is half of the maximal field of view.

TABLE 9

(Embodiment 4)
f = 4.32 mm, Fno = 2.40, HFOV = 32.6 deg.

| Surface # | | Curvature Radius | Thickness | Material | Index | Abbe # | Focal length |
|---|---|---|---|---|---|---|---|
| 0 | Object | Plano | Infinity | | | | |
| 1 | Ape. Stop | Plano | −0.290 | | | | |
| 2 | Lens 1 | 1.553410 (ASP) | 0.603 | Plastic | 1.530 | 55.8 | 2.78 |
| 3 | | −24.256200 (ASP) | 0.120 | | | | |
| 4 | Lens 2 | −7.769100 (ASP) | 0.250 | Plastic | 1.633 | 23.4 | −6.10 |
| 5 | | 7.759600 (ASP) | 0.650 | | | | |
| 6 | Lens 3 | −5.475300 (ASP) | 0.487 | Plastic | 1.607 | 26.6 | −7.53 |
| 7 | | 28.571400 (ASP) | 0.230 | | | | |
| 8 | Lens 4 | −4.189900 (ASP) | 0.836 | Plastic | 1.535 | 56.3 | 2.14 |
| 9 | | −0.960060 (ASP) | 0.443 | | | | |
| 10 | Lens 5 | −2.370800 (ASP) | 0.659 | Plastic | 1.530 | 55.8 | −2.13 |
| 11 | | 2.366600 (ASP) | 0.500 | | | | |
| 12 | IR-filter | Plano | 0.300 | Glass | 1.517 | 64.2 | — |
| 13 | | Plano | 0.264 | | | | |
| 14 | Image | Plano | — | | | | |

* Reference wavelength is d-line 587.6 nm

TABLE 10

Aspheric Coefficients

| Surface # | 2 | 3 | 4 | 5 | 6 |
|---|---|---|---|---|---|
| k = | −5.62638E+00 | −5.00000E+01 | −6.88364E+01 | −2.00000E+01 | −2.38568E+00 |
| A4 = | 1.93777E−01 | −2.05969E−02 | −4.80949E−02 | −2.74417E−02 | −2.25965E−01 |
| A6 = | −1.19938E−01 | 7.87981E−02 | 6.89891E−02 | 1.34861E−01 | −7.42062E−02 |
| A8 = | 1.08844E−01 | −1.51717E−01 | 1.24355E−01 | −2.29037E−01 | 1.13668E−01 |
| A10 = | −7.40064E−02 | 1.75172E−01 | −3.89041E−01 | 4.47172E−01 | −6.29890E−02 |
| A12 = | 5.55787E−02 | −1.36886E−01 | 3.61311E−01 | −5.13266E−01 | 7.81160E−03 |

TABLE 10-continued

| Aspheric Coefficients | | | | |
|---|---|---|---|---|
| A14 = | −3.41545E−02 | 3.95071E−02 | −1.00794E−01 | 2.65741E−01 |

| Surface # | 7 | 8 | 9 | 10 | 11 |
|---|---|---|---|---|---|
| k = | −1.71377E+01 | 7.12188E+00 | −2.69993E+00 | −7.67840E+00 | −1.43268E+01 |
| A4 = | −1.58940E−01 | −6.89600E−02 | −1.07534E−01 | 8.98978E−02 | −1.42037E−02 |
| A6 = | −8.98736E−03 | 1.48469E−01 | 1.26062E−01 | −5.02752E−02 | 6.75081E−03 |
| A8 = | 7.00423E−02 | −1.64819E−01 | −7.16092E−02 | 1.04597E−02 | −3.99487E−03 |
| A10 = | −4.88230E−02 | 1.31525E−01 | 2.92352E−02 | −4.93041E−04 | 9.22328E−04 |
| A12 = | 1.48956E−02 | −6.59902E−02 | −1.03829E−02 | −1.01146E−04 | −9.66106E−05 |
| A14 = | | 1.39402E−02 | 1.74298E−03 | 1.03193E−05 | 3.83217E−06 |

The equation of the aspheric surface profiles of the fourth embodiment has the same form as that of the first embodiment. Moreover, the description of the factors in the relations is as those set forth in the first embodiment, but the values of the relations of the fourth embodiment are listed in the following TABLE 11.

TABLE 11

(Embodiment 4)

| f | 4.32 | (R7 − R8)/(R7 + R8) | 0.63 |
|---|---|---|---|
| Fno | 2.40 | (R9 + R10)/(R9 − R10) | 0.00 |
| HFOV | 32.6 | R8/f | −0.22 |
| V1-V2-V3 | 5.80 | f/f3 | −0.58 |
| T12/T23 | 0.18 | f2/f3 | 0.81 |
| T34/T45 | 0.52 | f4/f5 | −1.00 |
| CT3/CT2 | 1.95 | SD/TD | 0.93 |
| (R1 + R2)/(R1 − R2) | −0.88 | TTL/ImgH | 1.84 |

Embodiment 5

Figure 5A:
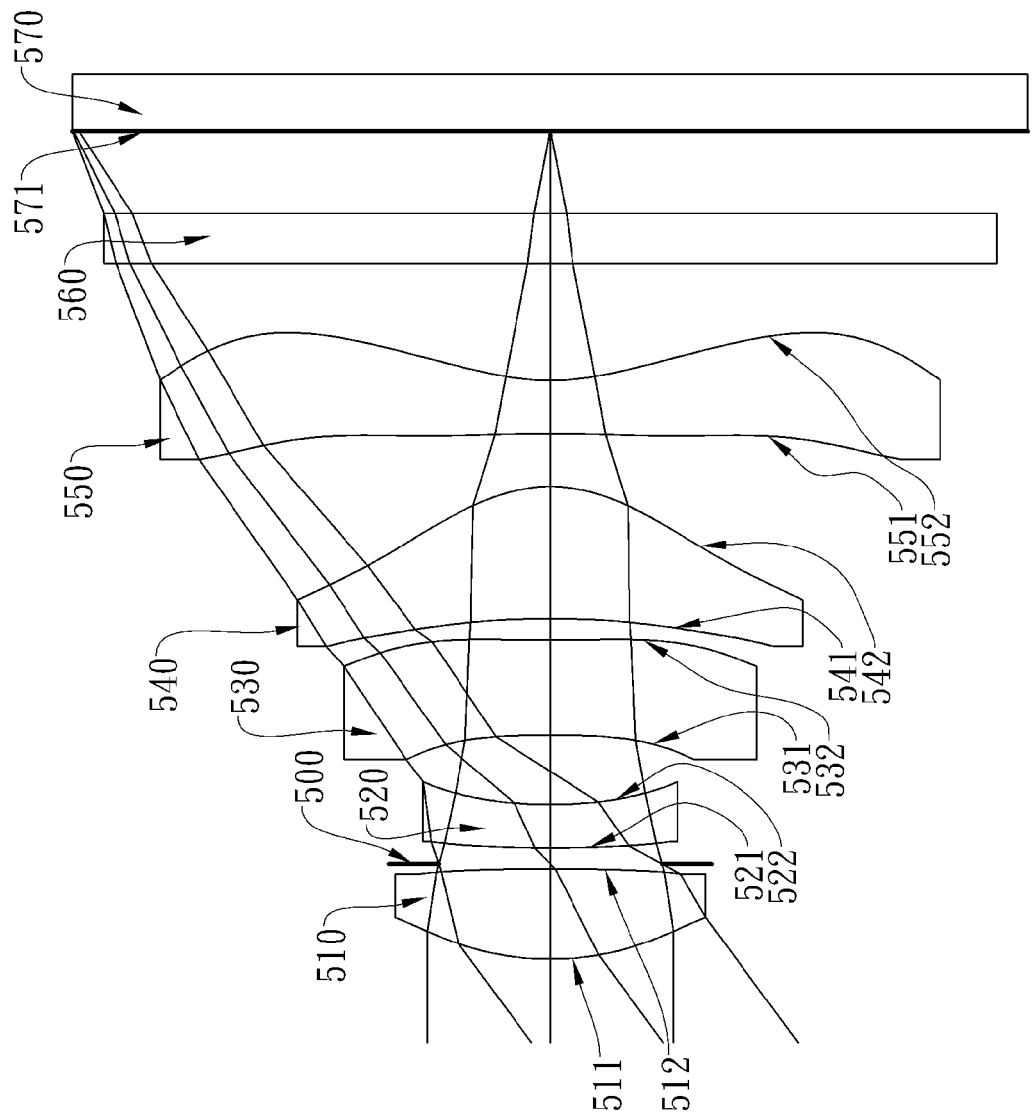
FIG. 5A shows an image capturing lens assembly in accordance with a fifth embodiment of the present invention.
Figure 5B:
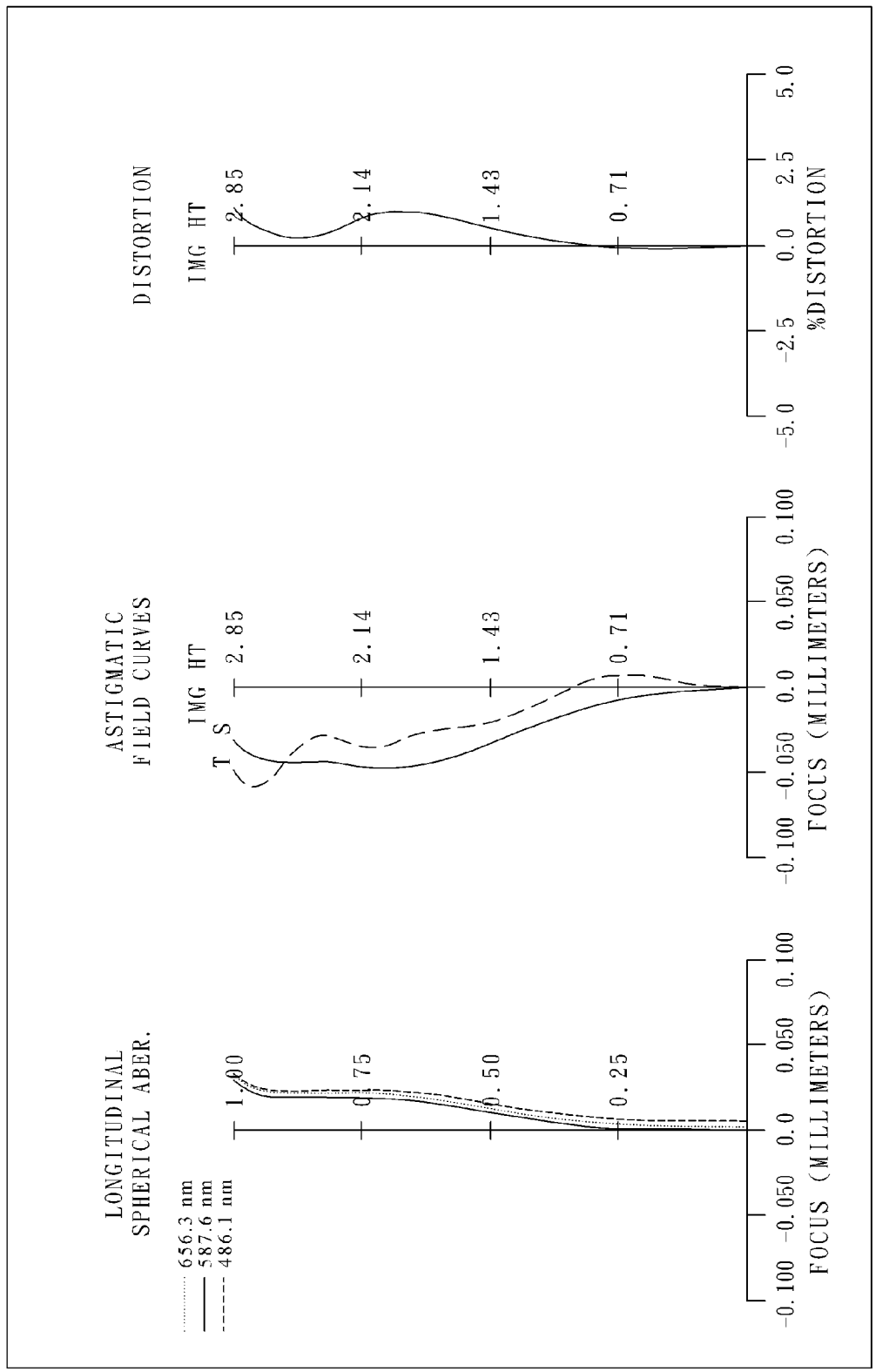
FIG. 5B shows the aberration curves of the fifth embodiment of the present invention.

FIG. 5A shows an image capturing lens assembly in accordance with the fifth embodiment of the present invention, and FIG. 5B shows the aberration curves of the fifth embodiment of the present invention. The image capturing lens assembly of the fifth embodiment of the present invention mainly comprises five lens elements, in order from an object side to an image side:

a first lens element 510 made of plastic with positive refractive power having a convex object-side surface 511 and a convex image-side surface 512, the object-side and image-side surfaces 511 and 512 thereof being aspheric;

a second lens element 520 made of plastic with negative refractive power having a convex object-side surface 521 and a concave image-side surface 522, the object-side and image-side surfaces 521 and 522 thereof being aspheric;

a third lens element 530 made of plastic with negative refractive power having a concave object-side surface 531 and a concave image-side surface 532, the object-side and image-side surfaces 531 and 532 thereof being aspheric, and at least one inflection point is formed on the image-side surface 532 thereof;

a fourth lens element 540 made of plastic with positive refractive power having a concave object-side surface 541 and a convex image-side surface 542, the object-side and image-side surfaces 541 and 542 thereof being aspheric; and a fifth lens element 550 made of plastic with negative refractive power having a concave object-side surface 551 and a concave image-side surface 552, the object-side and image-side surfaces 551 and 552 thereof being aspheric, and at least one inflection point is formed on the image-side surface 552 thereof;

wherein an aperture stop 500 is disposed between the first lens element 510 and the second lens element 520;

the image capturing lens assembly further comprises an IR filter 560 disposed between the image-side surface 552 of the fifth lens element 550 and an image plane 571, and the IR filter 560 is made of glass and has no influence on the focal length of the image capturing lens assembly; the image capturing lens assembly further comprises an image sensor 570 provided on the image plane 571.

The detailed optical data of the fifth embodiment is shown in TABLE 12, and the aspheric surface data is shown in TABLE 13, wherein the units of the radius of curvature, the thickness and the focal length are expressed in mm, and HFOV is half of the maximal field of view.

TABLE 12

(Embodiment 5)
f = 3.83 mm, Fno = 2.60, HFOV = 36.3 deg.

| Surface # | | Curvature Radius | Thickness | Material | Index | Abbe # | Focal length |
|---|---|---|---|---|---|---|---|
| 0 | Object | Plano | Infinity | | | | |
| 1 | Lens 1 | 1.638760 (ASP) | 0.542 | Plastic | 1.535 | 56.3 | 2.78 |
| 2 | | −14.315500 (ASP) | 0.030 | | | | |
| 3 | Ape. Stop | Plano | 0.095 | | | | |
| 4 | Lens 2 | 9.418000 (ASP) | 0.260 | Plastic | 1.650 | 21.4 | −5.29 |
| 5 | | 2.491880 (ASP) | 0.417 | | | | |
| 6 | Lens 3 | −6.974700 (ASP) | 0.571 | Plastic | 1.614 | 25.6 | −7.26 |
| 7 | | 12.746200 (ASP) | 0.127 | | | | |
| 8 | Lens 4 | −5.615900 (ASP) | 0.794 | Plastic | 1.535 | 56.3 | 1.76 |
| 9 | | −0.844330 (ASP) | 0.315 | | | | |

TABLE 12-continued (Embodiment 5)
f = 3.83 mm, Fno = 2.60, HFOV = 36.3 deg.

| Surface # | | Curvature Radius | Thickness | Material | Index | Abbe # | Focal length |
|---|---|---|---|---|---|---|---|
| 10 | Lens 5 | −8.329300 (ASP) | 0.320 | Plastic | 1.535 | 56.3 | −2.13 |
| 11 | | 1.333670 (ASP) | 0.700 | | | | |
| 12 | IR-filter | Plano | 0.300 | Glass | 1.517 | 64.2 | — |
| 13 | | Plano | 0.495 | | | | |
| 14 | Image | Plano | — | | | | |

* Reference wavelength is d-line 587.6 nm

TABLE 13

| Aspheric Coefficients | | | | | |
|---|---|---|---|---|---|
| Surface # | 1 | 2 | 4 | 5 | 6 |
| k = | −6.08720E+00 | −5.00000E+01 | −2.02789E+01 | −1.99658E+00 | −3.50938E+01 |
| A4 = | 1.61907E−01 | −2.10926E−03 | 2.22780E−02 | 1.27072E−02 | −1.90845E−01 |
| A6 = | −1.37289E−01 | 6.29557E−03 | 6.00484E−02 | 1.43442E−01 | −3.88125E−02 |
| A8 = | 1.08941E−01 | −1.04746E−01 | 1.85307E−02 | −1.91021E−01 | 1.03393E−01 |
| A10 = | −8.98894E−02 | 1.08954E−01 | −2.35782E−01 | 3.64091E−01 | −3.18922E−02 |
| A12 = | 1.10316E−02 | −1.75572E−01 | 2.96890E−01 | −4.43251E−01 | −1.32735E−02 |
| A14 = | −1.48108E−02 | 1.39890E−01 | −1.08148E−01 | 2.52243E−01 | |
| Surface # | 7 | 8 | 9 | 10 | 11 |
| k = | 1.00000E+00 | 1.40117E+01 | −3.04685E+00 | 1.00000E+00 | −9.82505E+00 |
| A4 = | −1.13620E−01 | −5.08890E−02 | −1.12350E−01 | 9.03998E−02 | −1.83921E−02 |
| A6 = | −3.68064E−02 | 1.38031E−01 | 1.39078E−01 | −5.07923E−02 | 5.21109E−03 |
| A8 = | 7.17456E−02 | −1.60085E−01 | −6.90648E−02 | 1.01822E−02 | −3.78711E−03 |
| A10 = | −4.13838E−02 | 1.33670E−01 | 2.92272E−02 | −4.51417E−04 | 8.89284E−04 |
| A12 = | 1.03709E−02 | −6.47694E−02 | −1.08663E−02 | −9.07255E−05 | −9.40070E−05 |
| A14 = | | 1.28206E−02 | 1.77785E−03 | 8.87198E−06 | 4.11428E−06 |

The equation of the aspheric surface profiles of the fifth embodiment has the same form as that of the first embodiment. Moreover, the description of the factors in the relations is as those set forth in the first embodiment, but the values of the relations of the fifth embodiment are listed in the following TABLE 14.

TABLE 14

| (Embodiment 5) | | | |
|---|---|---|---|
| f | 3.83 | (R7 − R8)/(R7 + R8) | 0.74 |
| Fno | 2.60 | (R9 + R10)/(R9 − R10) | 0.72 |
| HFOV | 36.3 | R8/f | −0.22 |
| V1−V2−V3 | 9.30 | f/f3 | −0.53 |
| T12/T23 | 0.30 | f2/f3 | 0.73 |
| T34/T45 | 0.40 | f4/f5 | −0.83 |
| CT3/CT2 | 2.20 | SD/TD | 0.84 |
| (R1 + R2)/(R1 − R2) | −0.79 | TTL/ImgH | 1.70 |

Embodiment 6

Figure 6A:
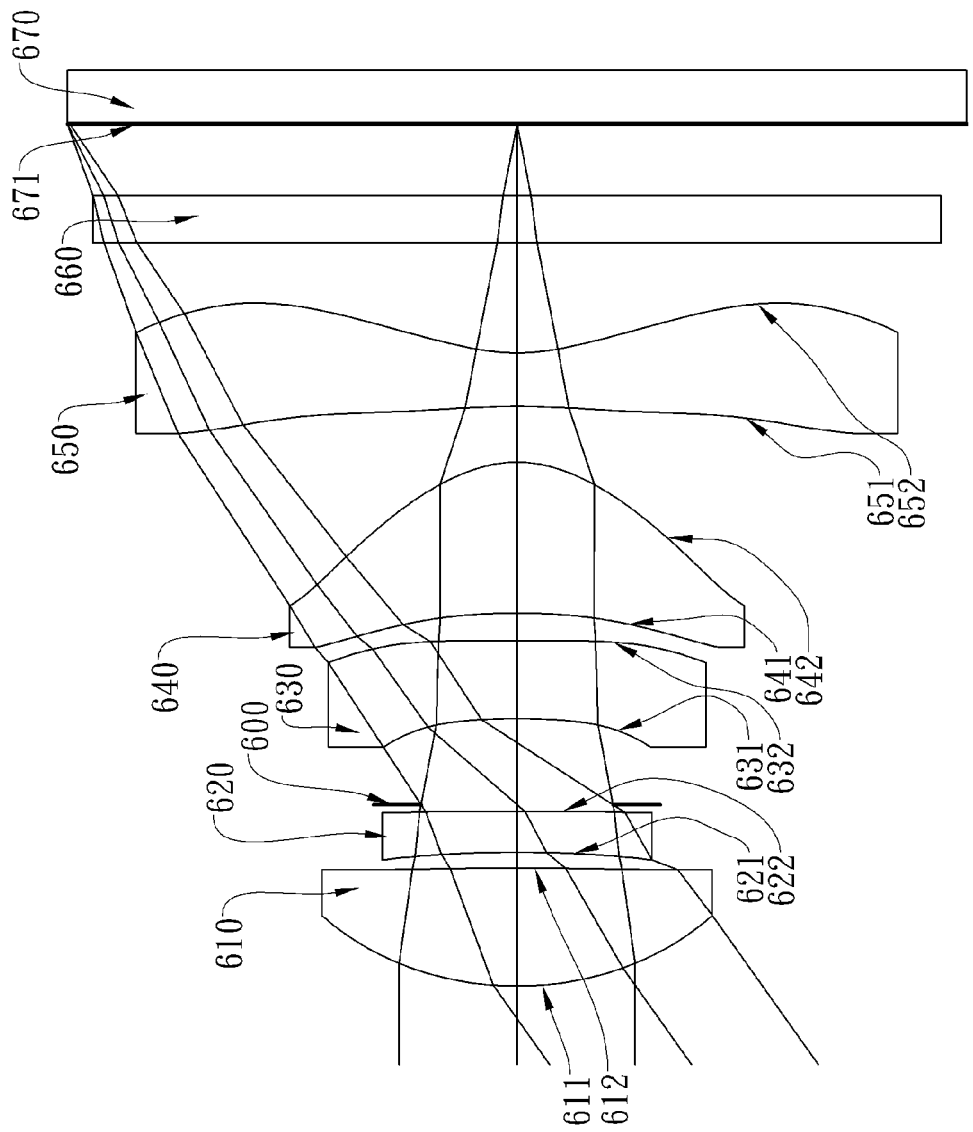
FIG. 6A shows an image capturing lens assembly in accordance with a sixth embodiment of the present invention.
Figure 6B:
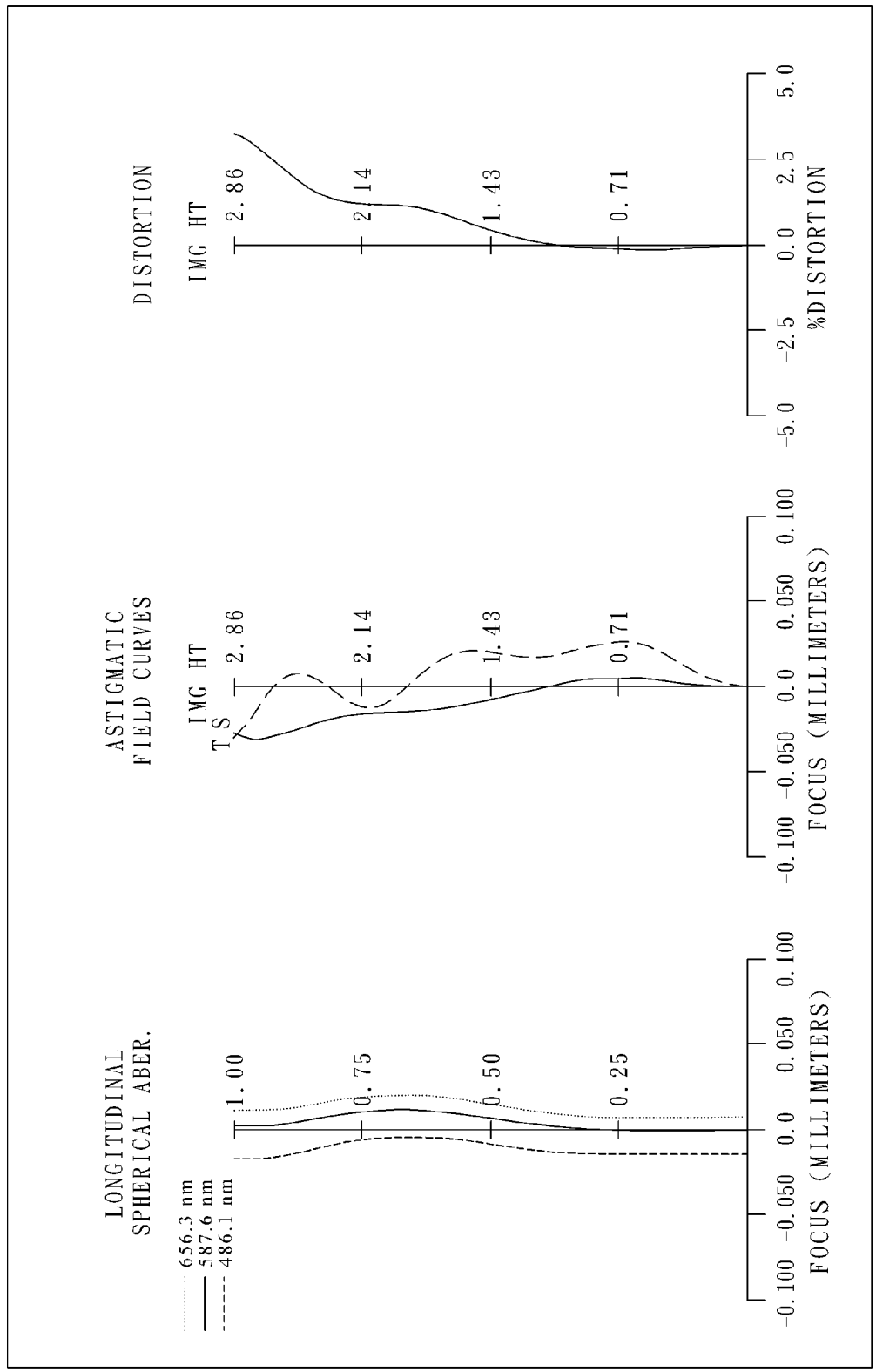
FIG. 6B shows the aberration curves of the sixth embodiment of the present invention.

FIG. 6A shows an image capturing lens assembly in accordance with the sixth embodiment of the present invention, and FIG. 6B shows the aberration curves of the sixth embodiment of the present invention. The image capturing lens assembly of the sixth embodiment of the present invention mainly comprises five lens elements, in order from an object side to an image side:

a first lens element 610 made of plastic with positive refractive power having a convex object-side surface 611 and a convex image-side surface 612, the object-side and image-side surfaces 611 and 612 thereof being aspheric;

a second lens element 620 made of plastic with negative refractive power having a concave object-side surface 621 and a concave image-side surface 622, the object-side and image-side surfaces 621 and 622 thereof being aspheric;

a third lens element 630 made of plastic with negative refractive power having a concave object-side surface 631 and a concave image-side surface 632, the object-side and image-side surfaces 631 and 632 thereof being aspheric, and at least one inflection point is formed on the image-side surface 632 thereof;

a fourth lens element 640 made of plastic with positive refractive power having a concave object-side surface 641 and a convex image-side surface 642, the object-side and image-side surfaces 641 and 642 thereof being aspheric; and a fifth lens element 650 made of plastic with negative refractive power having a concave object-side surface 651 and a concave image-side surface 652, the object-side and image-side surfaces 651 and 652 thereof being aspheric, and at least one inflection point is formed on the image-side surface 652 thereof;

wherein an aperture stop 600 is disposed between the second lens element 620 and the third lens element 630;

the image capturing lens assembly further comprises an IR filter 660 disposed between the image-side surface 652 of the fifth lens element 650 and an image plane 671, and the IR filter 660 is made of glass and has no influence on the focal length of the image capturing lens assembly; the image capturing lens assembly further comprises an image sensor 670 provided on the image plane 671.

The detailed optical data of the sixth embodiment is shown in TABLE 15, and the aspheric surface data is shown in TABLE 16, wherein the units of the radius of curvature, the thickness and the focal length are expressed in mm, and HFOV is half of the maximal field of view.

TABLE 15

(Embodiment 6)
f = 3.90 mm, Fno = 2.60, HFOV = 35.3 deg.

| Surface # | | Curvature Radius | Thickness | Material | Index | Abbe # | Focal length |
|---|---|---|---|---|---|---|---|
| 0 | Object | Plano | Infinity | | | | |
| 1 | Lens 1 | 2.022480 (ASP) | 0.750 | Plastic | 1.535 | 56.3 | 3.52 |
| 2 | | −23.620800 (ASP) | 0.100 | | | | |
| 3 | Lens 2 | −9.507400 (ASP) | 0.260 | Plastic | 1.633 | 23.4 | −11.88 |
| 4 | | 36.360200 (ASP) | 0.044 | | | | |
| 5 | Ape. Stop | Plano | 0.546 | | | | |
| 6 | Lens 3 | −4.987800 (ASP) | 0.494 | Plastic | 1.614 | 25.6 | −6.69 |
| 7 | | 24.213600 (ASP) | 0.178 | | | | |
| 8 | Lens 4 | −4.420700 (ASP) | 0.960 | Plastic | 1.535 | 56.3 | 1.61 |
| 9 | | −0.773830 (ASP) | 0.355 | | | | |
| 10 | Lens 5 | −5.005200 (ASP) | 0.340 | Plastic | 1.535 | 56.3 | −1.84 |
| 11 | | 1.255770 (ASP) | 0.700 | | | | |
| 12 | IR-filter | Plano | 0.300 | Glass | 1.517 | 64.2 | — |
| 13 | | Plano | 0.454 | | | | |
| 14 | Image | Plano | — | | | | |

* Reference wavelength is d-line 587.6 nm

TABLE 16

Aspheric Coefficients

| Surface # | 1 | 2 | 3 | 4 | 6 |
|---|---|---|---|---|---|
| k = | −8.55945E+00 | 1.00000E+00 | −6.88817E+01 | −6.03961E−14 | −4.51847E+01 |
| A4 = | 1.31090E−01 | −1.14600E−03 | −4.91241E−02 | −7.57358E−02 | −2.22511E−01 |
| A6 = | −9.52060E−02 | 4.49655E−02 | 3.69660E−02 | 9.28031E−02 | −7.80825E−02 |
| A8 = | 1.06354E−01 | −1.13154E−01 | 8.71813E−02 | −2.09730E−01 | 9.95616E−02 |
| A10 = | −9.54904E−02 | 1.84275E−01 | −2.98414E−01 | 3.88552E−01 | −4.58301E−02 |
| A12 = | 5.26627E−02 | −1.46059E−01 | 3.38514E−01 | −4.45942E−01 | 3.19610E−02 |
| A14 = | −1.19199E−02 | 4.18989E−02 | −1.41964E−01 | 2.39117E−01 | |

| Surface # | 7 | 8 | 9 | 10 | 11 |
|---|---|---|---|---|---|
| k = | −1.34871E+01 | 9.02764E+00 | −2.70669E+00 | −2.26054E−02 | −9.54631E+00 |
| A4 = | −1.01306E−01 | −8.60242E−02 | −1.56728E−01 | 9.80494E−02 | −1.52943E−01 |
| A6 = | −2.79838E−02 | 1.53433E−01 | 1.12182E−01 | −5.02408E−02 | 4.37960E−03 |
| A8 = | 6.78438E−02 | −1.57659E−01 | −6.63176E−02 | 1.01908E−02 | −3.57217E−03 |
| A10 = | −3.96558E−02 | 1.32285E−01 | 3.26801E−02 | −4.55690E−04 | 9.14410E−04 |
| A12 = | 9.11921E−03 | −6.52787E−02 | −1.00033E−02 | −9.21751E−05 | −9.41347E−05 |
| A14 = | | 1.38703E−02 | 1.64244E−03 | 8.59530E−06 | 3.30006E−06 |

The equation of the aspheric surface profiles of the sixth embodiment has the same form as that of the first embodiment. Moreover, the description of the factors in the relations is as those set forth in the first embodiment, but the values of the relations of the sixth embodiment are listed in the following TABLE 17.

TABLE 17

(Embodiment 6)

| f | 3.90 | (R7 − R8)/(R7 + R8) | 0.70 |
|---|---|---|---|
| Fno | 2.60 | (R9 + R10)/(R9 − R10) | 0.60 |
| HFOV | 35.3 | R8/f | −0.20 |
| V1-V2-V3 | 7.30 | f/f3 | −0.58 |
| T12/T23 | 0.17 | f2/f3 | 1.78 |
| T34/T45 | 0.50 | f4/f5 | −0.87 |
| CT3/CT2 | 1.90 | SD/TD | 0.71 |
| (R1 + R2)/(R1 − R2) | −0.84 | TTL/ImgH | 1.88 |

Embodiment 7

Figure 7A:
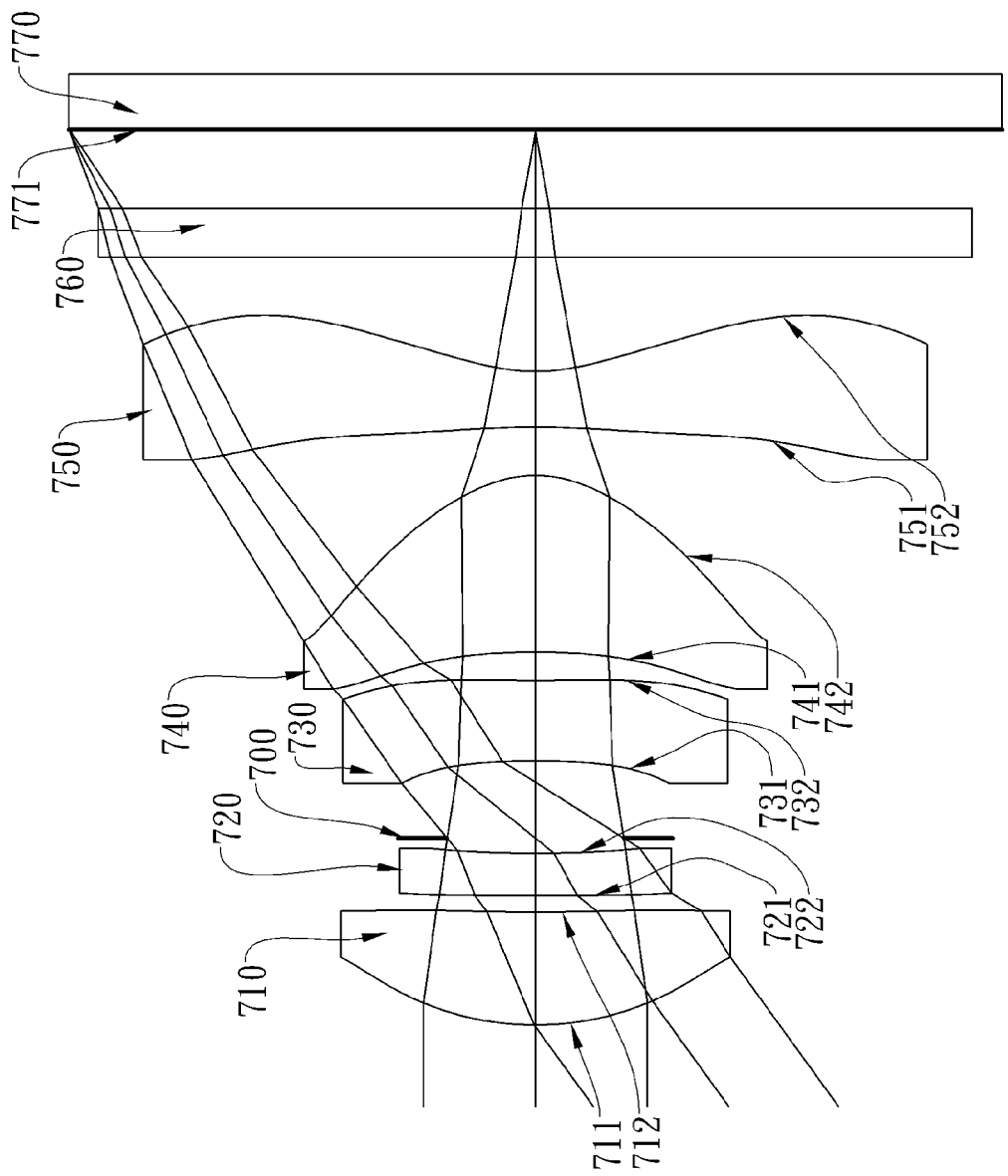
FIG. 7A shows an image capturing lens assembly in accordance with a seventh embodiment of the present invention.
Figure 7B:
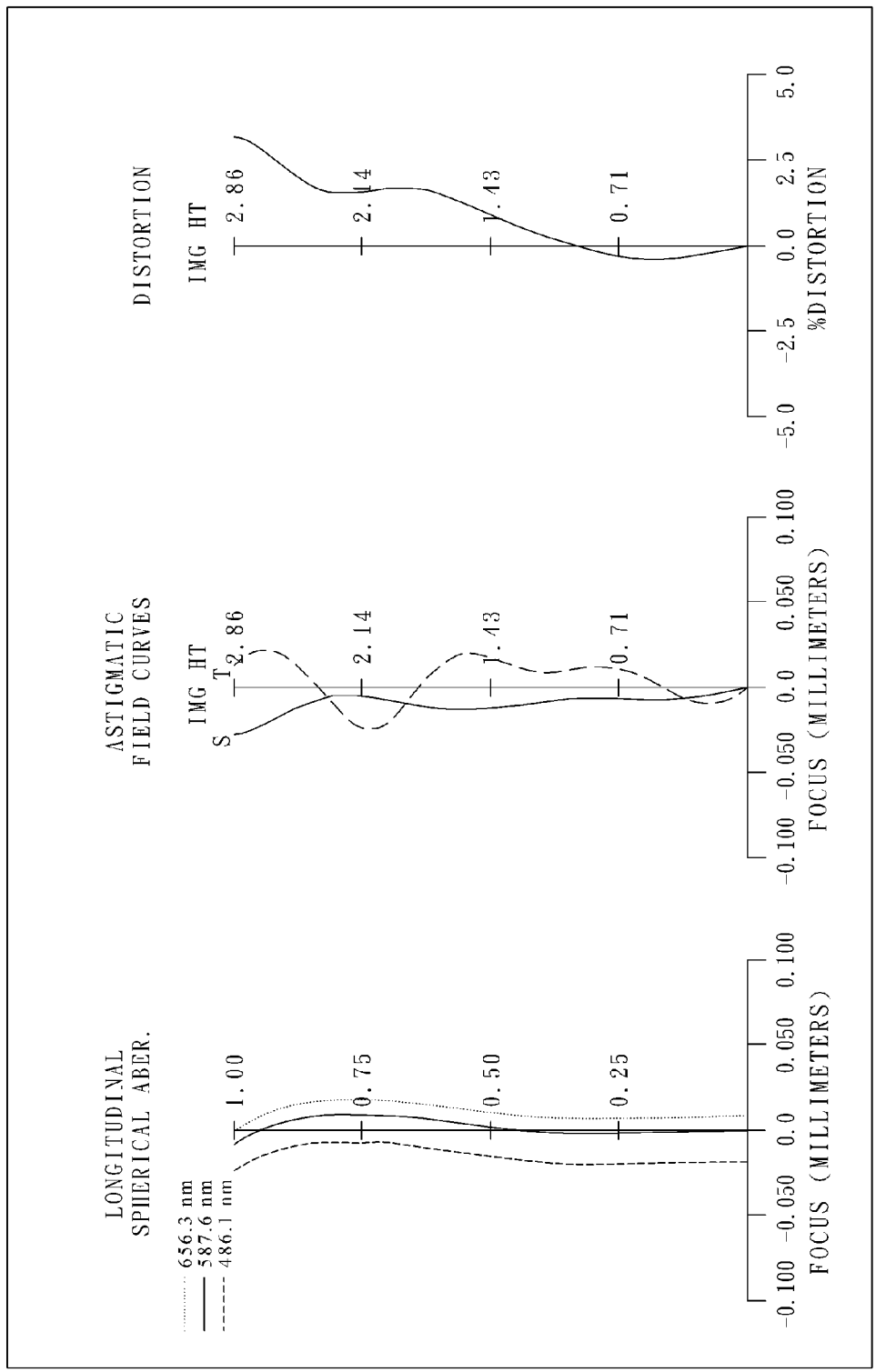
FIG. 7B shows the aberration curves of the seventh embodiment of the present invention.

FIG. 7A shows an image capturing lens assembly in accordance with the seventh embodiment of the present invention, and FIG. 7B shows the aberration curves of the seventh embodiment of the present invention. The image capturing lens assembly of the seventh embodiment of the present invention mainly comprises five lens elements, in order from an object side to an image side:

a first lens element 710 made of plastic with positive refractive power having a convex object-side surface 711 and a concave image-side surface 712, the object-side and image-side surfaces 711 and 712 thereof being aspheric;

a second lens element 720 made of plastic with negative refractive power having a convex object-side surface 721 and a concave image-side surface 722, the object-side and image-side surfaces 721 and 722 thereof being aspheric;

a third lens element 730 made of plastic with negative refractive power having a concave object-side surface 731 and a concave image-side surface 732, the object-side and image-side surfaces 731 and 732 thereof being aspheric, and at least one inflection point is formed on the image-side surface 732 thereof;

a fourth lens element 740 made of plastic with positive refractive power having a concave object-side surface 741 and a convex image-side surface 742, the object-side and image-side surfaces 741 and 742 thereof being aspheric; and a fifth lens element 750 made of plastic with negative refractive power having a concave object-side surface 751 and a concave image-side surface 752, the object-side and image-side surfaces 751 and 752 thereof being aspheric, and at least one inflection point is formed on the image-side surface 752 thereof;

wherein an aperture stop 700 is disposed between the second lens element 720 and the third lens element 730;

the image capturing lens assembly further comprises an IR filter 760 disposed between the image-side surface 752 of the fifth lens element 750 and an image plane 771, and the IR filter 760 is made of glass and has no influence on the focal length of the image capturing lens assembly; the image capturing lens assembly further comprises an image sensor 770 provided on the image plane 771.

The detailed optical data of the seventh embodiment is shown in TABLE 18, and the aspheric surface data is shown in TABLE 19, wherein the units of the radius of curvature, the thickness and the focal length are expressed in mm, and HFOV is half of the maximal field of view.

TABLE 18

(Embodiment 7)

f = 3.83 mm, Fno = 2.80, HFOV = 35.8 deg.

| Surface # | | Curvature Radius | Thickness | Material | Index | Abbe # | Focal length |
|---|---|---|---|---|---|---|---|
| 0 | Object | Plano | Infinity | | | | |
| 1 | Lens 1 | 1.818180 (ASP) | 0.691 | Plastic | 1.514 | 56.8 | 3.98 |
| 2 | | 14.285700 (ASP) | 0.100 | | | | |
| 3 | Lens 2 | 20.089000 (ASP) | 0.260 | Plastic | 1.633 | 23.4 | −16.72 |
| 4 | | 6.895700 (ASP) | 0.093 | | | | |
| 5 | Ape. Stop | Plano | 0.473 | | | | |
| 6 | Lens 3 | −6.294300 (ASP) | 0.494 | Glass | 1.633 | 23.4 | −6.95 |
| 7 | | 15.021700 (ASP) | 0.174 | | | | |
| 8 | Lens 4 | −4.437900 (ASP) | 1.083 | Plastic | 1.535 | 56.3 | 1.41 |
| 9 | | −0.697530 (ASP) | 0.295 | | | | |
| 10 | Lens 5 | −5.029700 (ASP) | 0.340 | Plastic | 1.544 | 55.9 | −1.58 |
| 11 | | 1.059600 (ASP) | 0.700 | | | | |
| 12 | IR-filter | Plano | 0.300 | Glass | 1.517 | 64.2 | — |
| 13 | | Plano | 0.480 | | | | |
| 14 | Image | Plano | — | | | | |

\* Reference wavelength is d-line 587.6 nm

TABLE 19

Aspheric Coefficients

| Surface # | 1 | 2 | 3 | 4 | 6 |
|---|---|---|---|---|---|
| k = | −6.05016E+00 | −5.00000E+01 | 6.14514E−15 | −8.77373E−17 | −5.00000E+01 |
| A4 = | 1.35500E−01 | −2.53260E−02 | −4.81189E−02 | −3.09185E−02 | −1.84501E−01 |
| A6 = | −8.87502E−02 | 2.67905E−02 | 3.18494E−02 | 7.96672E−02 | −1.08899E−01 |
| A8 = | 1.05579E−01 | −1.16821E−01 | 1.20602E−01 | −8.21582E−02 | 1.50024E−01 |
| A10 = | −1.00174E−01 | 1.91158E−01 | −2.36084E−01 | 5.70076E−01 | −6.43248E−02 |
| A12 = | 4.96425E−02 | −1.32973E−01 | 3.48739E−01 | −8.58411E−01 | 3.07036E−02 |
| A14 = | −1.22257E−02 | 3.11196E−02 | −2.15547E−01 | 2.39117E−01 | |

| Surface # | 7 | 8 | 9 | 10 | 11 |
|---|---|---|---|---|---|
| k = | −5.00000E+01 | 9.60661E+00 | −2.61801E+00 | −9.03408E−01 | −8.89204E+00 |
| A4 = | −9.84058E−02 | −1.17812E−01 | −1.71828E−01 | 9.20775E−02 | −1.47062E−02 |
| A6 = | −3.05175E−02 | 1.56502E−01 | 1.01823E−01 | −4.93443E−02 | 3.81662E−03 |
| A8 = | 6.38183E−02 | −1.52823E−01 | −6.76835E−02 | 1.01952E−02 | −3.55635E−03 |
| A10 = | −3.67541E−02 | 1.34191E−01 | 3.35572E−02 | −4.59717E−04 | 9.24582E−04 |
| A12 = | 9.13283E−03 | −6.47746E−02 | −9.46845E−03 | −9.30588E−05 | −9.24875E−05 |
| A14 = | | 1.39438E−02 | 1.81758E−03 | 8.50470E−06 | 2.96692E−06 |

The equation of the aspheric surface profiles of the seventh embodiment has the same form as that of the first embodiment. Moreover, the description of the factors in the relations is as those set forth in the first embodiment, but the values of the relations of the seventh embodiment are listed in the following TABLE 20.

TABLE 20

(Embodiment 7)

| f | 3.83 | (R7 − R8)/(R7 + R8) | 0.73 |
|---|---|---|---|
| Fno | 2.80 | (R9 + R10)/(R9 − R10) | 0.65 |
| HFOV | 35.8 | R8/f | −0.18 |
| V1-V2-V3 | 10.00 | f/f3 | −0.55 |
| T12/T23 | 0.18 | f2/f3 | 2.41 |
| T34/T45 | 0.59 | f4/f5 | −0.89 |
| CT3/CT2 | 1.90 | SD/TD | 0.71 |
| (R1 + R2)/(R1 − R2) | −1.29 | TTL/ImgH | 1.88 |

Embodiment 8

Figure 8A:
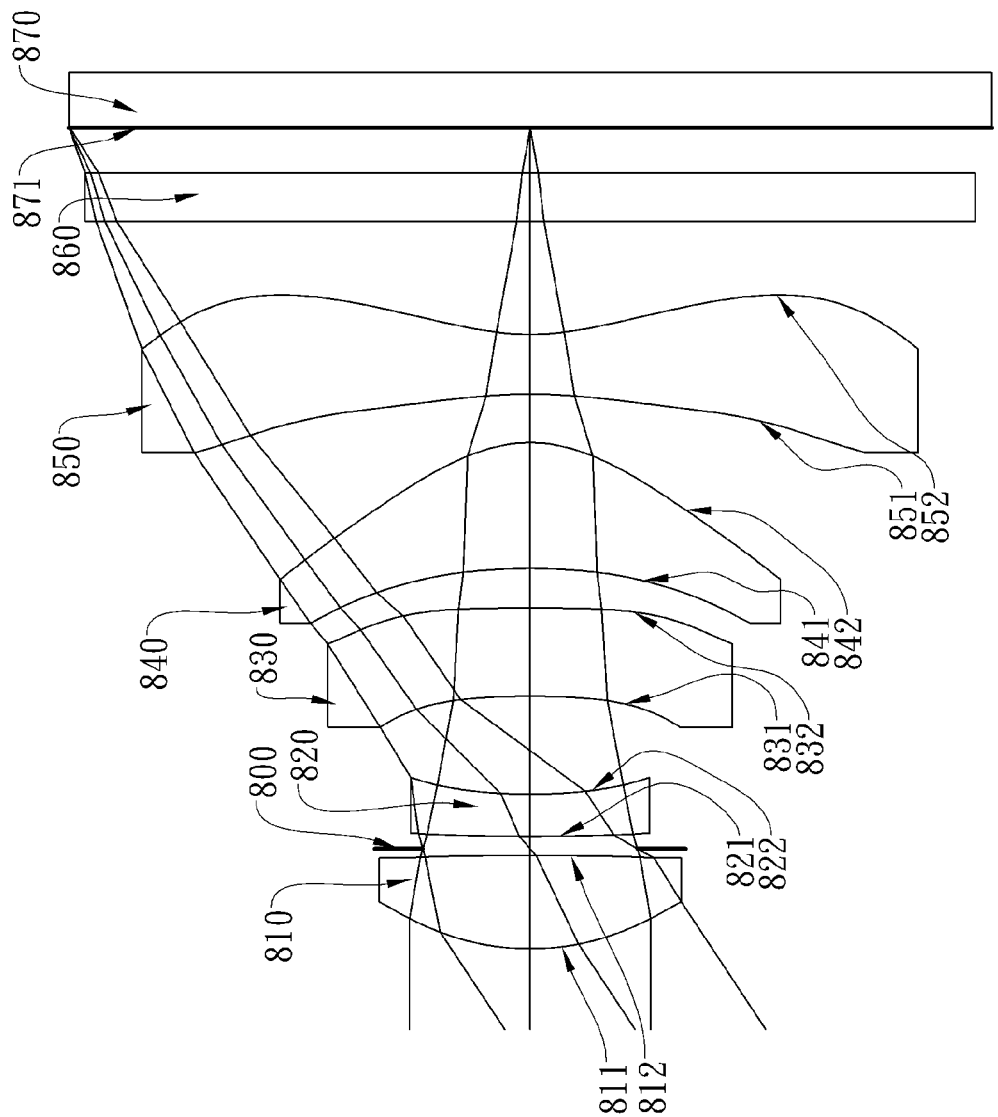
FIG. 8A shows an image capturing lens assembly in accordance with an eighth embodiment of the present invention.
Figure 8B:
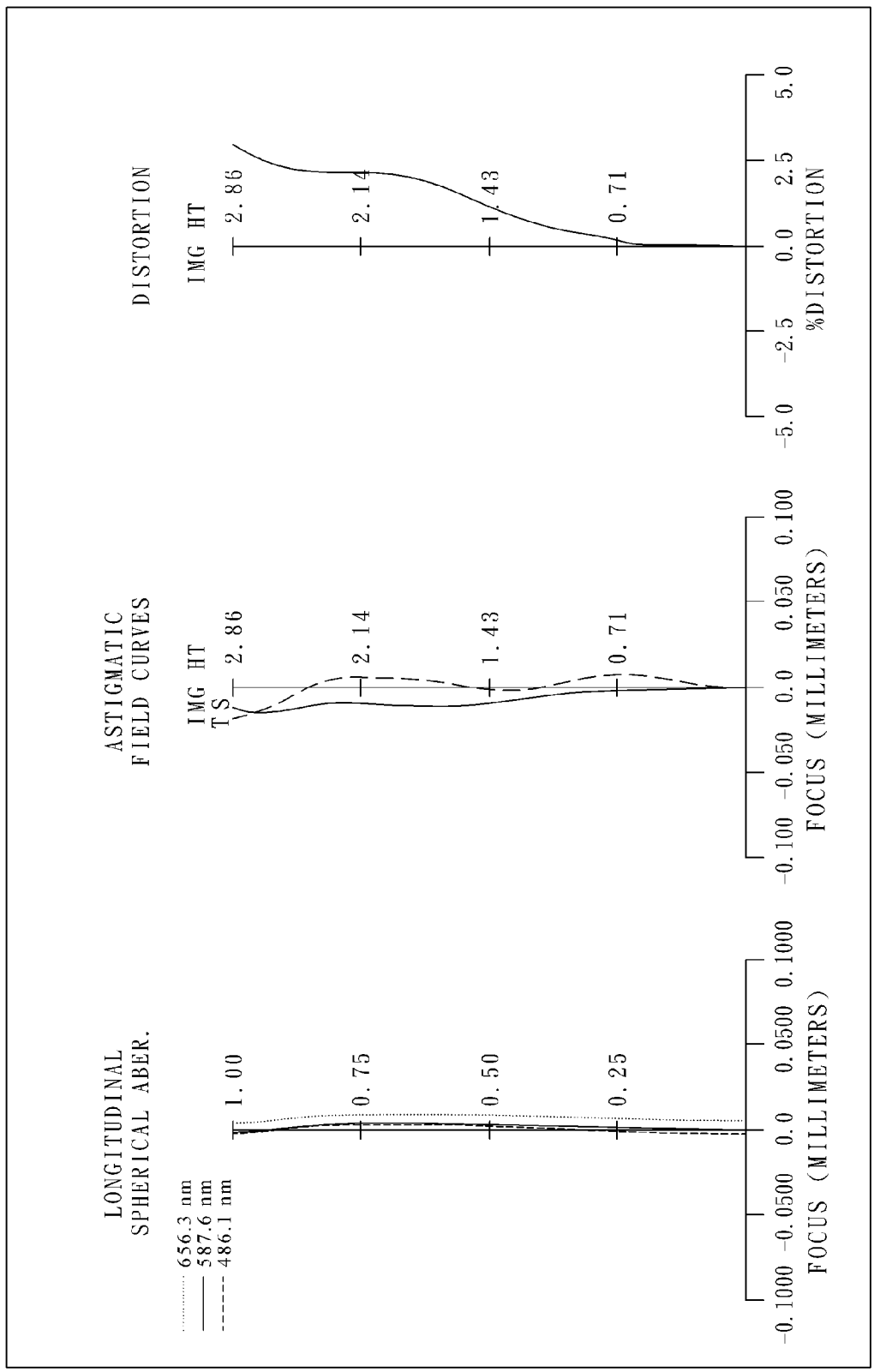
FIG. 8B shows the aberration curves of the eighth embodiment of the present invention.

FIG. 8A shows an image capturing lens assembly in accordance with the eighth embodiment of the present invention, and FIG. 8B shows the aberration curves of the eighth embodiment of the present invention. The image capturing lens assembly of the eighth embodiment of the present invention mainly comprises five lens elements, in order from an object side to an image side:

a first lens element 810 made of plastic with positive refractive power having a convex object-side surface 811 and a convex image-side surface 812, the object-side and image-side surfaces 811 and 812 thereof being aspheric;

a second lens element 820 made of plastic with negative refractive power having a convex object-side surface 821 and a concave image-side surface 822, the object-side and image-side surfaces 821 and 822 thereof being aspheric;

a third lens element 830 made of plastic with negative refractive power having a concave object-side surface 831 and a convex image-side surface 832, the object-side and image-side surfaces 831 and 832 thereof being aspheric;

a fourth lens element 840 made of plastic with positive refractive power having a concave object-side surface 841 and a convex image-side surface 842, the object-side and image-side surfaces 841 and 842 thereof being aspheric; and a fifth lens element 850 made of plastic with negative refractive power having a concave object-side surface 851 and a concave image-side surface 852, the object-side and image-side surfaces 851 and 852 thereof being aspheric, and at least one inflection point is formed on the image-side surface 852 thereof;

wherein an aperture stop 800 is disposed between the first lens element 810 and the second lens element 820;

the image capturing lens assembly further comprises an IR filter 860 disposed between the image-side surface 852 of the fifth lens element 850 and an image plane 871, and the IR filter 860 is made of glass and has no influence on the focal length of the image capturing lens assembly; the image capturing lens assembly further comprises an image sensor 870 provided on the image plane 871.

The detailed optical data of the eighth embodiment is shown in TABLE 21, and the aspheric surface data is shown in TABLE 22, wherein the units of the radius of curvature, the thickness and the focal length are expressed in mm, and HFOV is half of the maximal field of view.

TABLE 21

(Embodiment 8)
f = 4.18 mm, Fno = 2.80, HFOV = 33.5 deg.

| Surface # | | Curvature Radius | Thickness | Material | Index | Abbe # | Focal length |
|---|---|---|---|---|---|---|---|
| 0 | Object | Plano | Infinity | | | | |
| 1 | Lens 1 | 1.553220 (ASP) | 0.577 | Plastic | 1.535 | 56.3 | 2.81 |
| 2 | | −41.399000 (ASP) | 0.043 | | | | |
| 3 | Ape. Stop | Plano | 0.077 | | | | |
| 4 | Lens 2 | 17.182200 (ASP) | 0.260 | Plastic | 1.650 | 21.4 | −5.73 |
| 5 | | 3.042100 (ASP) | 0.607 | | | | |
| 6 | Lens 3 | −6.132400 (ASP) | 0.546 | Plastic | 1.583 | 30.2 | −12.04 |
| 7 | | −49.796300 (ASP) | 0.246 | | | | |
| 8 | Lens 4 | −4.095200 (ASP) | 0.780 | Plastic | 1.535 | 56.3 | 1.87 |
| 9 | | −0.856550 (ASP) | 0.301 | | | | |
| 10 | Lens 5 | −3.173500 (ASP) | 0.370 | Plastic | 1.535 | 56.3 | −1.84 |
| 11 | | 1.479940 (ASP) | 0.700 | | | | |
| 12 | IR-filter | Plano | 0.300 | Glass | 1.517 | 64.2 | — |
| 13 | | Plano | 0.279 | | | | |
| 14 | Image | Plano | — | | | | |

* Reference wavelength is d-line 587.6 nm

TABLE 22

Aspheric Coefficients

| Surface # | 1 | 2 | 4 | 5 | 6 |
|---|---|---|---|---|---|
| k = | −5.68999E+00 | −5.00000E+01 | −9.00000E+01 | −4.15231E+00 | −5.00000E+01 |
| A4 = | 1.84603E−01 | −2.78229E−02 | −3.34747E−02 | 5.61840E−03 | −1.70141E−01 |
| A6 = | −1.36607E−01 | 3.52353E−02 | 1.24990E−01 | 1.47884E−01 | −6.24383E−02 |
| A8 = | 1.09162E−01 | −7.98148E−02 | −5.37597E−02 | −1.86419E−01 | 1.11069E−01 |
| A10 = | −7.48311E−02 | 1.51195E−01 | −8.08849E−02 | 3.78728E−01 | −8.95226E−02 |
| A12 = | 1.74740E−02 | −2.84792E−01 | 1.88871E−01 | −4.25975E−01 | 3.26423E−02 |
| A14 = | −1.19975E−02 | 1.96957E−01 | −1.08148E−01 | 2.39118E−01 | |

| Surface # | 7 | 8 | 9 | 10 | 11 |
|---|---|---|---|---|---|
| k = | −3.85963E+01 | 6.74256E+00 | −2.91071E+00 | −1.16996E+00 | −1.10413E+01 |
| A4 = | −9.98428E−02 | −9.30857E−02 | −1.16608E−01 | 1.04959E−01 | −2.71076E−02 |
| A6 = | −4.48656E−02 | 1.41683E−01 | 1.24350E−01 | −5.17874E−02 | 8.67039E−03 |

TABLE 22-continued

Aspheric Coefficients

| A8 = | 6.74573E−02 | −1.55451E−01 | −6.96495E−02 | 1.00689E−02 | −4.07081E−03 |
|---|---|---|---|---|---|
| A10 = | −3.53410E−02 | 1.32393E−01 | 3.04712E−02 | −4.33592E−04 | 8.67599E−04 |
| A12 = | 9.52336E−03 | −6.53250E−02 | −1.05552E−02 | −8.68353E−05 | −9.10008E−05 |
| A14 = |  | 1.32369E−02 | 1.67004E−03 | 8.30635E−06 | 3.95623E−06 |

The equation of the aspheric surface profiles of the eighth embodiment has the same form as that of the first embodiment. Moreover, the description of the factors in the relations is as those set forth in the first embodiment, but the values of the relations of the eighth embodiment are listed in the following TABLE 23.

TABLE 23

(Embodiment 8)

| f | 4.18 | (R7 − R8)/(R7 + R8) | 0.65 |
|---|---|---|---|
| Fno | 2.80 | (R9 + R10)/(R9 − R10) | 0.36 |
| HFOV | 33.5 | R8/f | −0.20 |
| V1-V2-V3 | 4.70 | f/f3 | −0.35 |
| T12/T23 | 0.20 | f2/f3 | 0.48 |
| T34/T45 | 0.82 | f4/f5 | −1.02 |
| CT3/CT2 | 2.10 | SD/TD | 0.84 |
| (R1 + R2)/(R1 − R2) | −0.93 | TTL/ImgH | 1.75 |

Embodiment 9

Figure 9A:
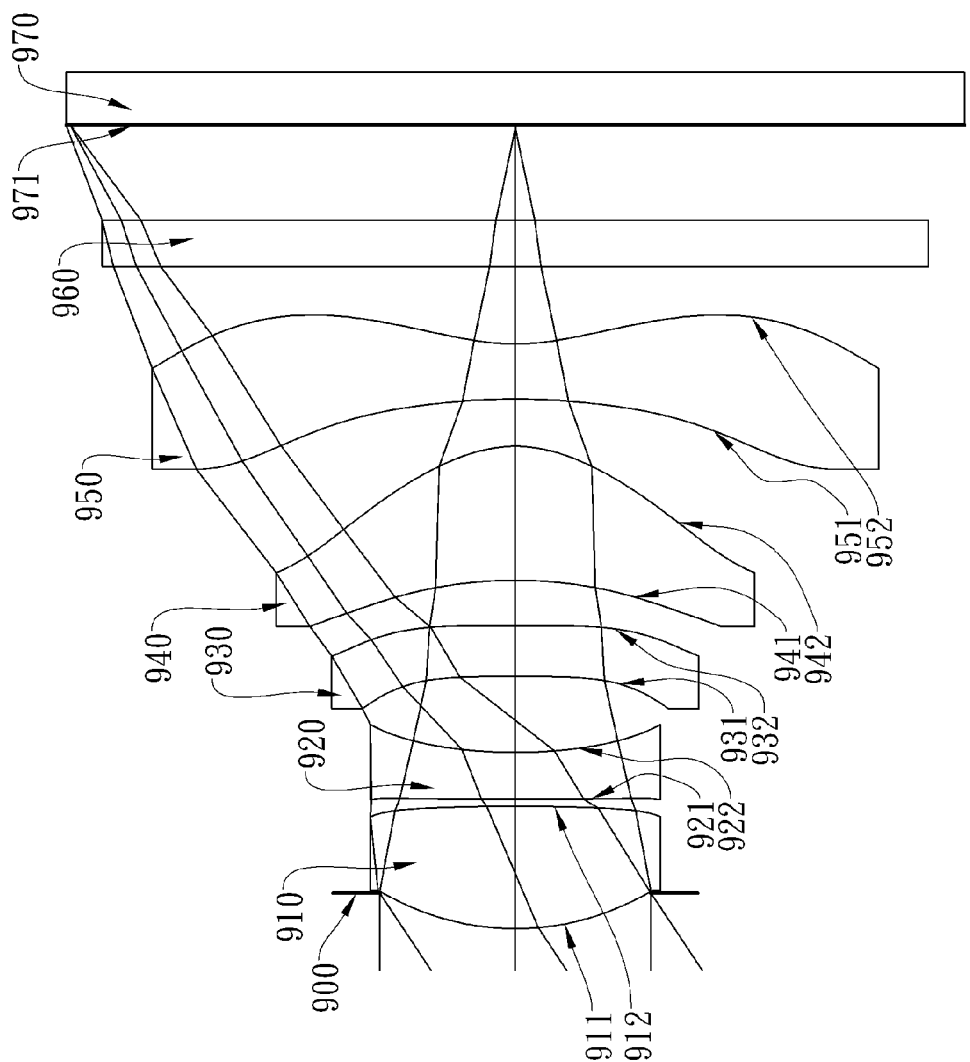
FIG. 9A shows an image capturing lens assembly in accordance with a ninth embodiment of the present invention.
Figure 9B:
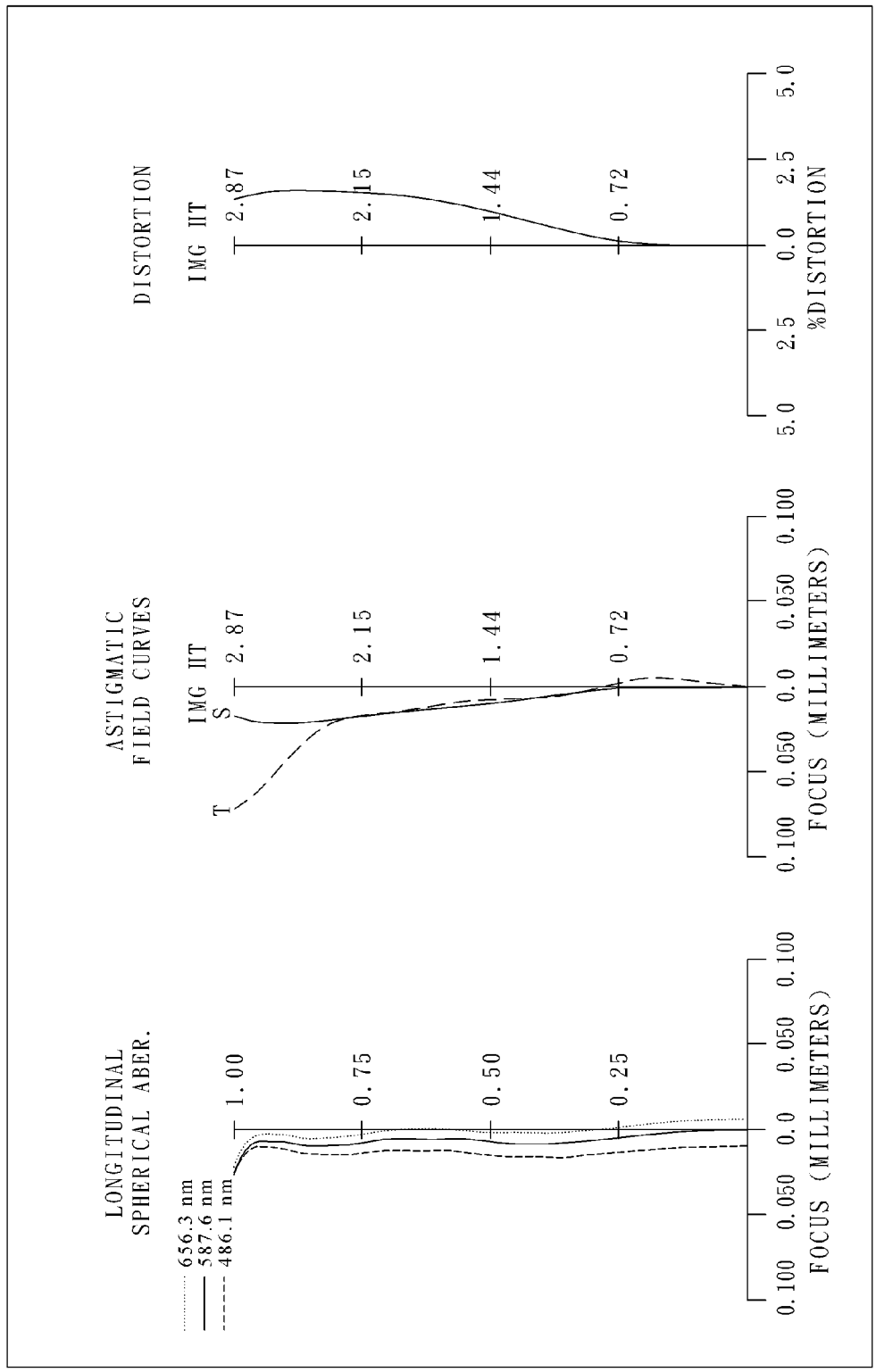
FIG. 9B shows the aberration curves of the ninth embodiment of the present invention.

FIG. 9A shows an image capturing lens assembly in accordance with the ninth embodiment of the present invention, and FIG. 9B shows the aberration curves of the ninth embodiment of the present invention. The image capturing lens assembly of the ninth embodiment of the present invention mainly comprises five lens elements, in order from an object side to an image side:

a first lens element 910 made of plastic with positive refractive power having a convex object-side surface 911 and a convex image-side surface 912, the object-side and image-side surfaces 911 and 912 thereof being aspheric;

a second lens element 920 made of plastic with negative refractive power having a convex object-side surface 921 and a concave image-side surface 922, the object-side and image-side surfaces 921 and 922 thereof being aspheric;

a third lens element 930 made of plastic with negative refractive power having a concave object-side surface 931 and a concave image-side surface 932, the object-side and image-side surfaces 931 and 932 thereof being aspheric, and at least one inflection point is formed on the image-side surface 932 thereof;

a fourth lens element 940 made of plastic with positive refractive power having a concave object-side surface 941 and a convex image-side surface 942, the object-side and image-side surfaces 941 and 942 thereof being aspheric; and a fifth lens element 950 made of plastic with negative refractive power having a concave object-side surface 951 and a concave image-side surface 952, the object-side and image-side surfaces 951 and 952 thereof being aspheric, and at least one inflection point is formed on the image-side surface 952 thereof;

wherein an aperture stop 900 is disposed between the imaged object and the first lens element 910;

the image capturing lens assembly further comprises an IR filter 960 disposed between the image-side surface 952 of the fifth lens element 950 and an image plane 971, and the IR filter 960 is made of glass and has no influence on the focal length of the image capturing lens assembly; the image capturing lens assembly further comprises an image sensor 970 provided on the image plane 971.

The detailed optical data of the ninth embodiment is shown in TABLE 24, and the aspheric surface data is shown in TABLE 25, wherein the units of the radius of curvature, the thickness and the focal length are expressed in mm, and HFOV is half of the maximal field of view.

TABLE 24

(Embodiment 9)
f = 4.29 mm, Fno = 2.45, HFOV = 33.5 deg.

| Surface # |  | Curvature Radius | Thickness | Material | Index | Abbe # | Focal length |
|---|---|---|---|---|---|---|---|
| 0 | Object | Plano | Infinity |  |  |  |  |
| 1 | Ape. Stop | Plano | −0.230 |  |  |  |  |
| 2 | Lens 1 | 1.670150 (ASP) | 0.790 | Plastic | 1.544 | 55.9 | 2.81 |
| 3 |  | −15.404200 (ASP) | 0.045 |  |  |  |  |
| 4 | Lens 2 | 100.000000 (ASP) | 0.303 | Plastic | 1.634 | 23.8 | −4.92 |
| 5 |  | 3.024200 (ASP) | 0.490 |  |  |  |  |
| 6 | Lens 3 | −51.985800 (ASP) | 0.327 | Plastic | 1.634 | 23.8 | −38.45 |
| 7 |  | 46.008200 (ASP) | 0.295 |  |  |  |  |
| 8 | Lens 4 | −2.798280 (ASP) | 0.865 | Plastic | 1.544 | 55.9 | 1.94 |
| 9 |  | −0.849270 (ASP) | 0.306 |  |  |  |  |
| 10 | Lens 5 | −3.886400 (ASP) | 0.355 | Plastic | 1.544 | 55.9 | −1.85 |
| 11 |  | 1.400710 (ASP) | 0.500 |  |  |  |  |
| 12 | IR-filter | Plano | 0.300 | Glass | 1.517 | 64.2 | — |
| 13 |  | Plano | 0.612 |  |  |  |  |
| 14 | Image | Plano | — |  |  |  |  |

* Reference wavelength is d-line 587.6 nm

TABLE 25

Aspheric Coefficients

| Surface # | 2 | 3 | 4 | 5 | 6 |
|---|---|---|---|---|---|
| k = | −7.75122E+00 | 1.15569E+00 | 9.00000E+01 | 3.61095E+00 | 9.00000E+01 |
| A4 = | 2.02762E−01 | −2.12635E−02 | −1.55691E−02 | −3.43223E−02 | −1.76515E−01 |
| A6 = | −1.81904E−01 | 6.27588E−02 | 1.58889E−02 | 4.43234E−02 | −1.56581E−01 |
| A8 = | 1.41092E−01 | −2.03616E−01 | 2.37429E−01 | 1.41576E−01 | 2.49630E−01 |
| A10 = | −3.23979E−02 | 2.85137E−01 | −6.58106E−01 | −3.43372E−01 | −2.15516E−01 |
| A12 = | −5.21945E−02 | −2.69938E−01 | 6.78827E−01 | 3.36794E−01 | 9.10668E−02 |
| A14 = | 2.32001E−02 | 7.69446E−02 | −2.84876E−01 | −1.16700E−01 | |

| Surface # | 7 | 8 | 9 | 10 | 11 |
|---|---|---|---|---|---|
| k = | −7.16403E+01 | 2.97629E+00 | −3.17884E+00 | −4.42392E+01 | −1.10237E+01 |
| A4 = | −1.09958E−01 | 1.05504E−03 | −1.23063E−01 | −1.67196E−02 | −5.04612E−02 |
| A6 = | −9.98126E−02 | 8.30786E−02 | 1.13712E−01 | −2.01577E−02 | 1.20365E−02 |
| A8 = | 1.20811E−01 | −1.74977E−01 | −8.65710E−02 | 8.49463E−03 | −3.87579E−03 |
| A10 = | −4.93236E−02 | 1.95860E−01 | 4.35265E−02 | −5.71669E−04 | 9.47800E−04 |
| A12 = | 1.08010E−02 | −9.57501E−02 | −9.72237E−03 | −1.18144E−04 | −1.32528E−04 |
| A14 = | | 1.79023E−02 | 6.82434E−04 | 1.39048E−05 | 7.85591E−06 |

The equation of the aspheric surface profiles of the ninth embodiment has the same form as that of the first embodiment. Moreover, the description of the factors in the relations is as those set forth in the first embodiment, but the values of the relations of the ninth embodiment are listed in the following TABLE 26.

TABLE 26

(Embodiment 9)

| f | 4.29 | (R7 − R8)/(R7 + R8) | 0.53 |
|---|---|---|---|
| Fno | 2.45 | (R9 + R10)/(R9 − R10) | 0.47 |
| HFOV | 33.5 | R8/f | −0.20 |
| V1−V2−V3 | 8.30 | f/f3 | −0.11 |
| T12/T23 | 0.09 | f2/f3 | 0.13 |
| T34/T45 | 0.96 | f4/f5 | −1.05 |
| CT3/CT2 | 1.08 | SD/TD | 0.94 |
| (R1 + R2)/(R1 − R2) | −0.80 | TTL/ImgH | 1.77 |

It is to be noted that TABLES 1-26 show different data of the different embodiments, however, the data of the different embodiments are obtained from experiments. Therefore, any image capturing lens assembly of the same structure is considered to be within the scope of the present invention even if it uses different data. The embodiments depicted above and the appended drawings are exemplary and are not intended to limit the scope of the present invention.

What is claimed is:

1. An image capturing lens assembly comprising, in order from an object side to an image side:
    a first lens element with positive refractive power having a convex object-side surface;
    a second lens element with negative refractive power;
    a third lens element with negative refractive power having a concave object-side surface;
    a fourth lens element having a concave object-side surface and a convex image-side surface; and
    a fifth lens element having a concave image-side surface, the object-side and image-side surfaces thereof being aspheric and at least one inflection point being formed on at least one of the object-side and image-side surfaces thereof;
    wherein a focal length of the image capturing lens assembly is f, a focal length of the third lens element is f3, a central thickness of the third lens element is CT3, a central thickness of the second lens element is CT2, a focal length of the second lens element is f2, and they satisfy the following relations:

$-1.5 < f/f3 < -0.3$;

$CT3/CT2 > 1.5$; and $0 < f2/f3$.

2. The image capturing lens assembly according to claim 1, wherein the fourth lens element has positive refractive power and is made of plastic, and the fifth lens element has negative refractive power and is made of plastic.

3. The image capturing lens assembly according to claim 2, wherein the fifth lens element has a concave object-side surface.

4. The image capturing lens assembly according to claim 3, wherein the focal length of the second lens element is f2, the focal length of the third lens element is f3, and they satisfy the following relation:

$0.35 < f2/f3 < 2.5$.

5. The image capturing lens assembly according to claim 4, wherein a focal length of the fourth lens element is f4, a focal length of the fifth lens element is f5, and they satisfy the following relation:

$-1.2 < f4/f5 < -0.7$.

6. The image capturing lens assembly according to claim 4, wherein an axial distance between the first lens element and the second lens element is T12, an axial distance between the second lens element and the third lens element is T23, and they satisfy the following relation:

$0.04 < T12/T23 < 0.40$.

7. The image capturing lens assembly according to claim 2, wherein a radius of the curvature of the object-side surface of the fourth lens element is R7, a radius of the curvature of the image-side surface of the fourth lens element is R8, and they satisfy the following relation:

$0.2 < (R7-R8)/(R7+R8) < 0.9$.

8. The image capturing lens assembly according to claim 7, wherein an axial distance between the third lens element and the fourth lens element is T34, an axial distance between the fourth lens element and the fifth lens element is T45, and they satisfy the following relation:

$0.3 < T34/T45 < 0.85$.

9. The image capturing lens assembly according to claim 7, wherein the radius of the curvature of the image-side surface of the fourth lens element is R8, the focal length of the image capturing lens assembly is f, and they satisfy the following relation:

$-0.3 < R8/f < -0.1$.

10. The image capturing lens assembly according to claim 7, wherein a radius of the curvature of the object-side surface of the fifth lens element is R9, a radius of the curvature of the image-side surface of the fifth lens element is R10, and they satisfy the following relation:

$-0.01 < (R9+R10)/(R9-R10) < 0.8$.

11. The image capturing lens assembly according to claim 2, wherein an Abbe number of the first lens element is V1, an Abbe number of the second lens element is V2, an Abbe number of the third lens element is V3, and they satisfy the following relation:

$0 < V1-V2-V3 < 25$.

12. The image capturing lens assembly according to claim 1, wherein the focal length of the image capturing lens assembly is f, the focal length of the third lens element is f3, and they satisfy the following relation:

$-1.0 < f/f3 < -0.5$.

13. The image capturing lens assembly according to claim 12, wherein a radius of the curvature of the object-side surface of the first lens element is R1, a radius of the curvature of the image-side surface of the first lens element is R2, and they satisfy the following relation:

$-1.6 < (R1+R2)/(R1-R2) < -0.7$.

14. The image capturing lens assembly according to claim 12, further comprising a stop, an axial distance between the stop and the image-side surface of the fifth lens element is SD, an axial distance between an object-side surface of the first lens element and the image-side surface of the fifth lens element is TD, and they satisfy the following relation:

$0.65 < SD/TD < 0.97$.

15. The image capturing lens assembly according to claim 1, further comprising an image sensor on an image plane; an axial distance between the object-side surface of the first lens element and the image plane is TTL, half of a diagonal length of an effective photosensitive area of the image sensor is ImgH, and they satisfy the following relation:

$TTL/ImgH < 2.0$.

16. An image capturing lens assembly comprising, in order from an object side to an image side:
a first lens element with positive refractive power having a convex object-side surface;
a second lens element with negative refractive power;
a third lens element with negative refractive power having a concave object-side surface;
a fourth lens element with positive refractive power having a concave object-side surface and a convex image-side surface, and the fourth lens element is made of plastic; and
a fifth lens element with negative refractive power having a concave object-side surface and a concave image-side surface, the object-side and image-side surfaces thereof being aspheric, at least one inflection point being formed on at least one of the object-side and image-side surfaces thereof, and the fifth lens element is made of plastic;
wherein a focal length of the image capturing lens assembly is f, a focal length of the third lens element is f3, a central thickness of the third lens element is CT3, a central thickness of the second lens element is CT2, a focal length of the second lens element is f2, and they satisfy the following relations:

$-1.5 < f/f3 < -0.3$;

$CT3/CT2 > 1.5$; and $0 < f2/f3$.

17. The image capturing lens assembly according to claim 16, wherein a focal length of the fourth lens element is f4, a focal length of the fifth lens element is f5, and they satisfy the following relation:

$-1.2 < f4/f5 < -0.7$.

18. The image capturing lens assembly according to claim 17, wherein an Abbe number of the first lens element is V1, an Abbe number of the second lens element is V2, an Abbe number of the third lens element is V3, and they satisfy the following relation:

$0 < V1-V2-V3 < 25$.

19. The image capturing lens assembly according to claim 18, wherein a radius of the curvature of the image-side surface of the fourth lens element is R8, the focal length of the image capturing lens assembly is f, and they satisfy the following relation:

$0.3 < R8/f < -0.1$.

20. The image capturing lens assembly according to claim 18, wherein an axial distance between the third lens element and the fourth lens element is T34, an axial distance between the fourth lens element and the fifth lens element is T45, and they satisfy the following relation:

$0.3 < T34/T45 < 0.85$.

* * * * *